(12) United States Patent
Bathla

(10) Patent No.: US 10,831,983 B2
(45) Date of Patent: Nov. 10, 2020

(54) TECHNIQUES FOR MANAGING DISPLAY OF HEADERS IN AN ELECTRONIC DOCUMENT

(71) Applicant: Oracle International Corporation, Redwood Shores, CA (US)

(72) Inventor: Samir Bathla, Wilton, CT (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 15/704,966

(22) Filed: Sep. 14, 2017

(65) Prior Publication Data

US 2018/0081863 A1  Mar. 22, 2018

Related U.S. Application Data

(60) Provisional application No. 62/396,065, filed on Sep. 16, 2016, provisional application No. 62/428,470, filed on Nov. 30, 2016.

(51) Int. Cl.
*G06F 3/048* (2013.01)
*G06F 40/106* (2020.01)
(Continued)

(52) U.S. Cl.
CPC .......... *G06F 40/106* (2020.01); *G06F 3/0485* (2013.01); *G06F 16/9038* (2019.01);
(Continued)

(58) Field of Classification Search
CPC .......... G06F 17/30; G06F 17/20; G06F 3/048; G06F 16/30; G06F 16/20
See application file for complete search history.

(56) References Cited

U.S. PATENT DOCUMENTS

D717,817 S  11/2014  Yu et al.
D748,147 S  1/2016  Capela et al.
(Continued)

FOREIGN PATENT DOCUMENTS

WO  2018053315  3/2018

OTHER PUBLICATIONS

"Sticky Tab Headers Revisited—Creating functional and flexible sticky table headers," retrieved at https://tympanus.net/Tutorials/StickyTableHeaders/ on Dec. 15, 2017, pp. 1-8.
(Continued)

*Primary Examiner* — Sanchita Roy
(74) *Attorney, Agent, or Firm* — Kilpatrick Townsend & Stockton LLP

(57) ABSTRACT

Techniques are disclosed for managing display of content in an electronic document. Specifically, the techniques can enable headers related to content to be selectively moved. For example, headers in a data table, or data table header for content in an electronic document may be displayed in a graphical interface such that the graphical interface is animated for the selective movement of the headers to display the content that is visible. The selective movement of the headers may enable the content in an electronic document to be managed for display such that a header can be visible when content related to the header is visible in the graphical interface. By selectively moving content, such as headers in a document, a document may be rendered in an animated, or moving fashion to render related content together.

21 Claims, 27 Drawing Sheets

(51) Int. Cl.
*G06F 16/9038* (2019.01)
*G06F 40/186* (2020.01)
*G06F 40/258* (2020.01)
*G06F 3/0485* (2013.01)
*G06F 40/177* (2020.01)

(52) U.S. Cl.
CPC .......... *G06F 40/186* (2020.01); *G06F 40/258* (2020.01); *G06F 40/177* (2020.01)

(56) References Cited

U.S. PATENT DOCUMENTS

| | | | |
|---|---|---|---|
| D753,709 S | 4/2016 | Kawanabe | |
| D771,658 S | 11/2016 | Kim et al. | |
| D777,752 S | 1/2017 | Heller et al. | |
| D780,205 S | 2/2017 | Jensen et al. | |
| D786,271 S | 5/2017 | Randon | |
| D795,897 S | 8/2017 | Kyakuno et al. | |
| D799,530 S | 10/2017 | Wu et al. | |
| D800,745 S | 10/2017 | Kyakuno et al. | |
| D803,865 S | 11/2017 | Nedelka et al. | |
| D804,501 S | 12/2017 | Perez et al. | |
| D810,754 S | 2/2018 | Bao et al. | |
| D810,765 S | 2/2018 | Ross et al. | |
| D817,969 S | 5/2018 | Potts | |
| D822,693 S | 7/2018 | Javor et al. | |
| D835,135 S | 12/2018 | Ross et al. | |
| D835,136 S | 12/2018 | Ross et al. | |
| D835,137 S | 12/2018 | Ross et al. | |
| D836,663 S | 12/2018 | Chung et al. | |
| D838,285 S | 1/2019 | Zhu et al. | |
| D838,733 S | 1/2019 | Grossman et al. | |
| D841,017 S | 2/2019 | Bathla | |
| 2003/0016235 A1 | 1/2003 | Odagawa | |
| 2008/0016437 A1* | 1/2008 | Fenkes | G06F 17/246 715/227 |
| 2009/0144607 A1* | 6/2009 | Chen | G06F 17/245 715/227 |
| 2012/0036455 A1* | 2/2012 | Holt | G06F 3/0482 715/753 |
| 2013/0086464 A1 | 4/2013 | Thangappan | |
| 2015/0026620 A1 | 1/2015 | Kwon et al. | |
| 2016/0004668 A1 | 1/2016 | Rowles et al. | |
| 2016/0026356 A1* | 1/2016 | Persaud | G06F 3/0485 715/212 |
| 2016/0378326 A1* | 12/2016 | Svinth | G06F 40/18 715/784 |

OTHER PUBLICATIONS

JQuery.floatThead, retrieved at http://mkoryak.github.io/floatThead/ on Dec. 15, 2017; pp. 1-11.
PCT Application No. PCT/US2017/051861, "International Search Report and Written Opinion", dated Nov. 9, 2017, 14 pages.
U.S. Appl. No. 29/578,016, "Non Final Office Action", dated Aug. 1, 2018, 7 pages.
U.S. Appl. No. 29/673,299, "Notice of Allowance", dated Apr. 3, 2019, 7 pages.
PCT/US2017/051861, "International Preliminary Report on Patentability", dated Mar. 28, 2019, 9 pages.
European Application No. EP17780923.3, "Office Action", dated Jan. 22, 2020, 6 pages.

* cited by examiner

| Corner (4) 202 | Column Header (3) 204 |
|---|---|
| Row Header (2) 210 | Databody (1) 212 |

TECHNIQUES FOR MANAGING DISPLAY OF HEADERS IN AN ELECTRONIC DOCUMENT

CROSS-REFERENCES TO RELATED APPLICATIONS

The present application is a non-provisional patent application of and claims the benefit and priority of the following patent applications:
1. U.S. Provisional Application No. 62/396,065, filed Sep. 16, 2016 entitled "TECHNIQUES FOR MANAGING DISPLAY OF HEADERS IN AN ELECTRONIC DOCUMENT"; and
2. U.S. Provisional Application No. 62/428,470, filed Nov. 30, 2016 entitled "TECHNIQUES FOR MANAGING DISPLAY OF HEADERS IN AN ELECTRONIC DOCUMENT."

The entire contents of each of the patent applications identified above are incorporated herein by reference for all purposes and is considered part of this disclosure.

This present application is related to U.S. Design patent application Ser. No. 29/578,016 filed on Sep. 16, 2016 and entitled "DISPLAY SCREEN OR PORTION THEREOF WITH ANIMATED GRAPHICAL USER INTERFACE FOR SELECTIVE MOVEMENT OF A DATA TABLE HEADER." The above-identified patent application is incorporated herein by reference for all intents and purposes.

BACKGROUND

The present disclosure relates generally to techniques for displaying electronic content in a document. More specifically, techniques are disclosed for generating and rendering electronic content based on interaction within a graphical interface.

Many people have come to rely on electronic documents for accessing information. Electronic documents, like spreadsheet documents and web documents, may be produced in many different forms for viewing in different applications on a computer. Often times, the content in an electronic document may be presented in many different applications. As such, the document may be prepared in different formats and/or using different techniques or tools for generating the electronic document. The content in an electronic document may be rendered differently based on many factors such as the format, display device, and application displaying the document. The content may not be visible in some instances. For example, an electronic document with one or more data tables may not be entirely visible in an application. An attempt to view the remainder of the content not originally visible may result in disappearance of the content previously visible. In one instance, upon scrolling, the headers (e.g., column and row headers) of a table may no longer be visible related to the visible content.

BRIEF SUMMARY

In certain embodiments, techniques are provided for managing display of content in an electronic document. Specifically, the techniques can enable headers related to content to be selectively moved. For example, headers in a data table, or data table header for content in an electronic document may be displayed in a graphical interface such that the graphical interface is animated for the selective movement of the headers to display the content that is visible. The selective movement of the headers may enable the content in an electronic document to be managed for display such that a header can be visible when content related to the header is visible in the graphical interface. By selectively moving content, such as headers in a document, a document may be rendered in an animated, or moving fashion to render related content together.

Such techniques disclosed herein visually enhance user experience for viewing electronic content to enable a user to remain visually aware of the context of content in a document as the view of the document changes. The techniques further improve the processing of a computer to reduce an overall amount of processing by the computer to render display of content in a document. Specifically, the computer may not need to manipulate, or regenerate a format of a document and/or may not need to adjusting scrolling of a visual display to show related content, such as headers and data related to the headers. The techniques further improve technical fields, such as technology for digital display management and electronic document rendering, such that a document may not be visible in manner that enables a user to view related content as the view of the document is adjusted by a user. These techniques may be implemented for rendering other types of content that may be affected by a display that is adjustable.

Some have implemented a scrolling mechanism; however, headers may eventually not be visible when a user scrolls the view. The context of the content is lost. Some applications may implement headers that are part of the application or fixed. However, such headers do not permit multiple tables in a single document to provide headers for each table. Fixed headers may be part of an application and not a document. Applications not equipped with fixed headers may be otherwise unable to present content with the headers in a display at all times, even when control is shifted off a screen.

In some embodiments, a computer system may be implemented for managing display of content in an electronic document. The computer system may be configured to implement methods and operations described herein. The computer system may include one or more processors and a memory accessible to the one or more processors, the memory storing instructions which, upon execution by the one or more processors, cause the one or more processors to perform one or more methods or operations described herein. Yet other embodiments relate to systems and machine-readable tangible storage media, which employ or store instructions for methods and operations described herein.

In some embodiments, a method may include determining a layout to display data corresponding to content in an electronic document at a device, where the layout includes a first header corresponding to a first dimension of the data and a second header corresponding to a second dimension of the data, and where the data is displayed based on the first dimension of the first header and the second dimension of the second header. The method may include identifying one or more attributes for presenting a first view of the electronic document at the device. The method may include providing a graphical interface for display at the device, where the graphical interface has the first view rendering a first portion of the data corresponding to the content, where the first portion is rendered having the first header and the second header in the first view. The method may include monitoring input corresponding to interaction with the graphical interface. The method may include detecting, based on an adjustment to the first view detected by monitoring input to the graphical interface, that a portion of the first view is not visible in the graphical interface due to the adjustment to the first view, where the portion of the first view includes the first header. The method may include, based on the detecting, generating a second view of the electronic document at the device, where the second view presents a second portion of the data corresponding to the content, where the second portion is determining based on the detected portion, where the second portion is presented as a change corresponding to the first header based on the detected portion of the first view, and where the second view presents the second header as rendered in the first view. The method may include causing the first view to be replaced with the second view in the graphical interface displayed at the device.

In some embodiments, the interaction corresponds to movement of an element in the graphical interface, the movement causing the adjustment to the first view in a vertical direction, and where the first header is a row header. In some embodiments, the interaction corresponds to movement of an element in the graphical interface, the movement causing the adjustment to the first view in a horizontal direction, and where the first header is a column header.

In some embodiments, the first view includes a first body where the first portion of the data is displayed based on the first dimension of the first header and the second dimension of the second header, where second view includes a second body where the second portion of the data is displayed, and where the second portion of the data includes at least some data in the first portion of the data.

In some embodiments, the second portion is presented with a modified first header for the change corresponding to the first header based on the detected portion of the first view, and where the modified first header in the second view represents the first dimension for the second portion of the data.

In some embodiments, the layout is a grid. The first header may be a row header and the second header may be a column header. The first header may be a column header and the second header may be a row header. The first dimension may be different from the second dimension.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 2A, 2B, 2C, and 2D illustrate a process for managing display of content in an electronic document.

FIGS. 4-21 illustrate graphical interfaces for displaying content and managing display of headers according to some embodiments.

DETAILED DESCRIPTION

In the following description, for the purposes of explanation, specific details are set forth in order to provide a thorough understanding of embodiments of the disclosure. However, it will be apparent that various embodiments may be practiced without these specific details. The figures and description are not intended to be restrictive.

I. High-Level Overview of Display Management System

Figure 1:
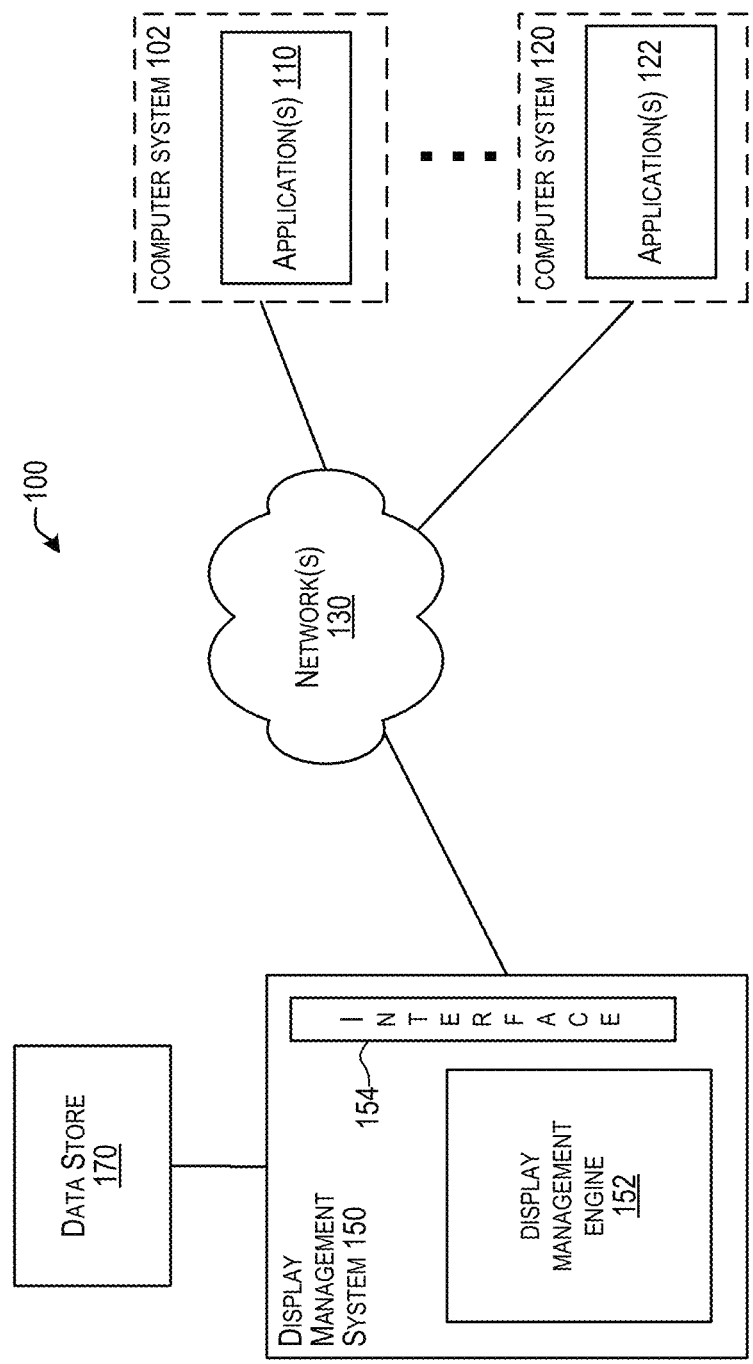
FIG. 1 illustrates a high-level diagram of system, in accordance with an embodiment of the present disclosure.

FIG. 1 illustrates an example of a system 100 that manages display of content, in accordance with some embodiments. One or more of the below-described techniques may be implemented in or involve one or more computer systems. The computing environment in FIG. 1 is not intended to suggest any limitation as to scope of use or functionality of described embodiments.

System 100 may include one or more computer systems 102, 120 (referred to herein as "client system" or "client") and display management system 150. A client may also include one or more applications, which may be referred to herein as "clients." Client system 120 may access one or more applications 122. Display management system 150 may be implemented by a computer system. Client systems may be operated by one or more users. Each application may be provided by display management system 150.

Client systems 102, 120 and display management system 150 may be communicatively connected via one or more communication networks 130. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols. In general, communication network 130 may include any communication network or infrastructure that facilitates communications between client systems and display management system 150.

In some embodiments, system 100 may include a communication system implemented by display management system 150, client system(s), or a combination thereof. The communication system may implement a push notification service (e.g., Apple push notification service provided by the Apple® corporation or Google notification service provided by the Google® corporation). The push notification service may facilitate communication with remote devices (e.g., endpoint devices or clients) through network 130. The push notification service may deliver a configured application to a client. Changes in display of content may be communicated in system 100 via communication system using pull and/or push mechanisms, e.g., a push or pull notification service, for communication. Push and/or pull mechanisms may be configured on a subscription basis for services provided by display management system 150.

Display management system 150 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, display management system 150 may correspond to a computer system for performing processing as described herein according to an embodiment of the present disclosure. The computing system that makes up display management system 150 may run any number of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, display management system 150 may be included in or implemented as a service such as Oracle Enterprise Performance Reporting Cloud Service (EPRCS), provided by Oracle® Corporation. In various embodiments, display management system 150 may be configured to run one or more services or software applications described in the foregoing disclosure. For example, display management system 150 may provide services according to a subscription.

In some embodiments, display management system 150 may be implemented as an enterprise computing system or a cloud computing system comprising one or more computers and/or servers that may include those described above. Display management system 150 may include several subsystems and/or modules, including some, which may not be shown. For example, display management system 150 may include interface 154 and display management engine 152. Display management engine 152 may perform display management functions. Display management system 150 may have more or fewer subsystems and/or modules than shown in the figure, may combine two or more subsystems and/or modules, or may have a different configuration or arrangement of subsystems and/or modules. Subsystems and modules of display management system 150 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, display management system 150 may also provide other services or software applications can include non-virtual and virtual environments. In some embodiments, these services may be offered as web-based or cloud services or under Software as a Service (SaaS) model to the users of client systems 102, 120. The services offered by display management system 150 may include application services. Application services may be provided by display management system 150 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in display management system 150, which may be implemented as a cloud infrastructure system. Users can acquire the application services without the need for customers to purchase separate licenses and support. Various different SaaS services may be provided. Users operating client systems 102, 120 may in turn utilize one or more applications to interact with display management system 150 to utilize the services provided by subsystems and/or modules of display management system 150.

Display management system 150 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in display management system 150 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Display management system 150 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, display management system 150 may be coupled to or may include one or more data stores, such as data store 170. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. Although depicted as different data stores, more or fewer data stores may be implemented to store data according to the techniques disclosed herein.

Display management system 150 may communicate multiple instances of client systems 102, 120 via interface 154. Interface 154 may be defined by one or more communication protocols or languages. In some embodiments, interface 154 may be defined by a programming interface (e.g., an application programming interface (API)). The programming interface may include callable functions to manage display of content. For example, interface 154 may provide a representational state transfer (REST)-based interface enabling access as a web-based service.

In some embodiments, interface 154 may generate and provide a graphical interface to client systems 102, 120. For example, interface 154 can provide an administrator graphical interface to enable a user (e.g., an administrator) to manage display of content. Client systems can manage (e.g., create, delete, edit, modify, update, or read) manage display of content through an interface provided by interface 154. Graphical interfaces illustrated in FIGS. 4-9 are examples of graphical interfaces to manage display of content.

System 100 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include a data store 170. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. Data store 170 may be accessible via a network. In some embodiments, display management system 150 may manage display of content using data store 170.

Display management system 150 may manage display of content according to techniques in this disclosure. Content may include electronic images, electronic data, audio, video, metadata, or other types of data. An electronic document may include an electronic file, an electronic spreadsheet, a Hypertext markup language (HTML) document, or other type of document that includes content, which is electronically displayable. In some embodiments, display management system 150 may operate automatically and/or based on requests from a client system. Through this disclosure, various flowcharts and techniques are disclosed illustrating processes according to some embodiments of the present disclosure. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in the figures may be implemented in software (e.g., code, instructions, program) executed by one or more processing units (e.g., processors cores), hardware, or combinations thereof. For example, display management system 150 of FIG. 1 can implement the processes described with reference to any of the figures. All or some of the processes disclosed herein may be performed by display management system 150, a client, or a combination thereof. Any of the processes may be implemented as a service. In some embodiments, any of the elements in the figures may be implemented with more or fewer subsystems and/or modules than shown in the figure, may combine two or more subsystems and/or modules, or may have a different configuration or arrangement of subsystems and/or modules. Subsystems and modules may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

The particular series of processing steps in the figures is not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, data may be stored using one or more data structures. Data structures may be organized in a variety of ways depending on how, what, and/or where data is stored. Although each of the data structures are shown including particular data, more or fewer data structures may be implemented to store the data. A data structure can include a reference to other data structures. The data structures may be implemented using one or more types of data structures including, without restriction, a linked list, an array, a hashtable, a map, a record, a graph, or other type of data structure. A data structure may be implemented in a hierarchical manner. Each of the data structures may be defined in a declarative manner based on input by a user. The data structures can be defined based on a template, e.g., a template defined based on a markup language, such as Extended Markup Language (XML). A data structure may have one or more formats, also referred to as a document format.

II. Processes for Managing Display of Headers in an Electronic Document

FIGS. 2A, 2B, 2C, 2D, and 3 illustrates a process for managing display of content in an electronic document. Part of the processes may be implemented during design-time, when displaying data corresponding to content in an electronic document is determined. All or part of the design time may proceed a process implemented during run-time. Run-time may be implemented to determine, in real-time, a view to display content in an electronic document on a display at a device (e.g., a client device). As described below, during design-time, a layout for displaying data corresponding to content in an electronic document may be determined.

FIG. 2A illustrates a diagram 200 of a display layout of an arrangement for displaying content of an electronic document. The display layout may be arranged using multiple portions or components. Using the arrangement, the content may be presented in the layout so as to enable management of headers displayed for the content. Display management system may determine the layout to display data corresponding to content in an electronic document at a device (e.g., a client). The content may be characters, numbers, values, and other information. The data may be an electronic representation of the content.

The layout may be a format by which the content is presented based on the data. For example, the layout may be a grid or a table, such as a data table. The layout may be include or be defined by one or more headers, such as row header 210 and column header 204. A header may correspond to a dimension of the data corresponding to the content. For example, a dimension may be an attribute of the data, such that the data corresponding to the dimension is presented in a view of the content on a display of the device. In at least one embodiment, the layout may include multiple headers. The headers can include a row header, a column header, or combinations thereof. A header may correspond to one or more dimensions. The layout may have an unequal number of row headers compared to column headers. Each header may be defined by multiple dimensions. For example, the layout may include a first header that is a row header and a second header that is a column header. For example, the layout may include a first header that is a column header and a second header that is a row header.

Data corresponding to content can be displayed based on the dimension of the first header and the second dimension of the second header. The dimension corresponding to each header may be different, such that data may be presented based on data that matches the dimensions that intersect, such as data in a cell of a table corresponding to a dimension of a column header and a dimension of a row header. For example, a dimension may be an attribute defining a specific type, category, or aspect of data. As disclosed below, a view may be generated to display content of an electronic document using the layout. Views may be altered or generated as the view is adjusted on a display.

In at least one embodiment, display management system 150 may determine a layout for displaying content. For example, display management system 150 may determine how to present content in a layout having multiple sections, such as section 1 (databody 212), section 2 (row header 210), section 3 (column header 204), and section 4 (corner 202). Content may be displayed in a table or a grid rendered in based on multiple sections, such as four sections. The layout may be generated based on input to an interface to define a layout. The layout may be defined using multiple sections as disclosed herein. The sections may include headers, which are defined based on input specifying the dimension(s) of a header. The interface may enable the user to specify the size of the header including the dimensions. Content for a table may be rendered using multiple sections so that some sections, such as a header, can be adjusted based on an adjustment of displaying the content of another section, e.g., the databody 212 or data corresponding to content. In some embodiments, content for a table may be generated for display according to a layout with headers in the document instead of headers (e.g., row or column headers) provided by an interface of an application, such as a spreadsheet application. In one example, the databody 212 may be presented in a bottom right corner as discussed below, with a column header 204 horizontally positioned above the databody 212 and a row header 210 vertically positioned to the left of the databody 212. In some embodiments, the layout may include a corner 202 that is used to determine a position of the headers 210, 204. In some embodiments, a table is displayed based on the layout for a document to be adjustable for view. Such embodiments may enable multiple tables to be presented in an electronic document. The headers may be part of the content such that they are floating, or move with the content rendered for a document.

Content may be displayed using a layout of multiple tables to allow for floating row and/or column headers. Code, or instructions may, such as JavaScript/jQuery, may be implemented to position and lock the header of tables as a document is adjusted (e.g., scrolled vertically or horizontally) for a view to display the table.

A table in a document may be displayed using a document object model (DOM), which defines an order to allow proper clipping when scrolling. In other words, the layout of a document may be defined by a DOM. The layout may be determined based on information included with or indicated by the electronic document. For example, the document may include metadata that can be used to determine the layout. In another example, a format of a language (e.g., HTML) and/or style (e.g., cascading style sheets) of content in a document may be processed to determine a layout. The order may be determining using the DOM. For example, an order may be defined as follows: (1) databody 212, (2) row header 210, (3) column header 204, and (4) corner 202. The order may be used to generate a view. When a display size of a display (e.g., a screen) of a device is restrictive, limiting view to a portion of data in a document, the view may be generated to hide portions of the data and/or headers. The order of the sections may be used to hide portions of the data and/or headers. The sticky headers may enable natural scrolling of the components using overflow, but can restricts headers as needed until no more of the databody is visible.

In some embodiments, a layout may be determined by analyzing the position of content in a document for displaying the document. The position may be determined by code (e.g., JavaScript). That analyzes information such as coordinates and/or location of content in a format of the document. Header(s) and/or data may have multiple cells for displaying information. The position of the header(s) and the data may be determined. In some embodiments, a corner in between an intersection of a column header (e.g., left of a column header) and a row header (e.g., top of a row header) may be used to monitor the relative positions of the headers.

Figure 2B:
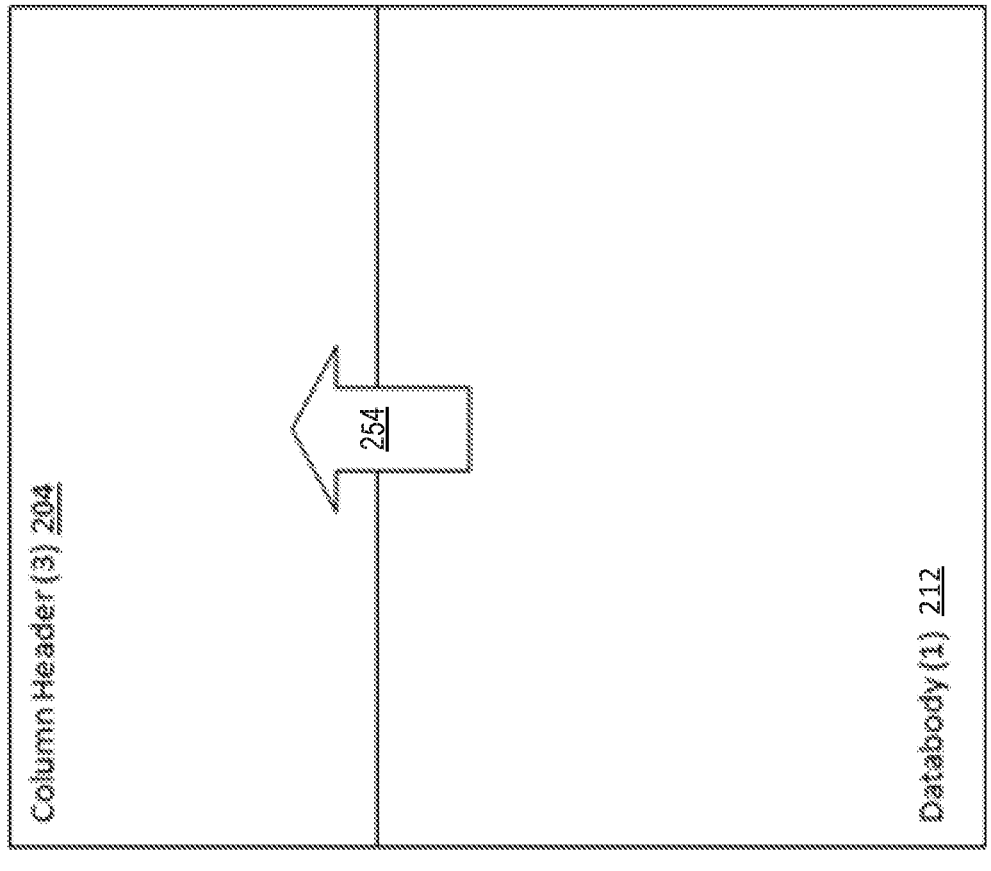
Figure 2B:
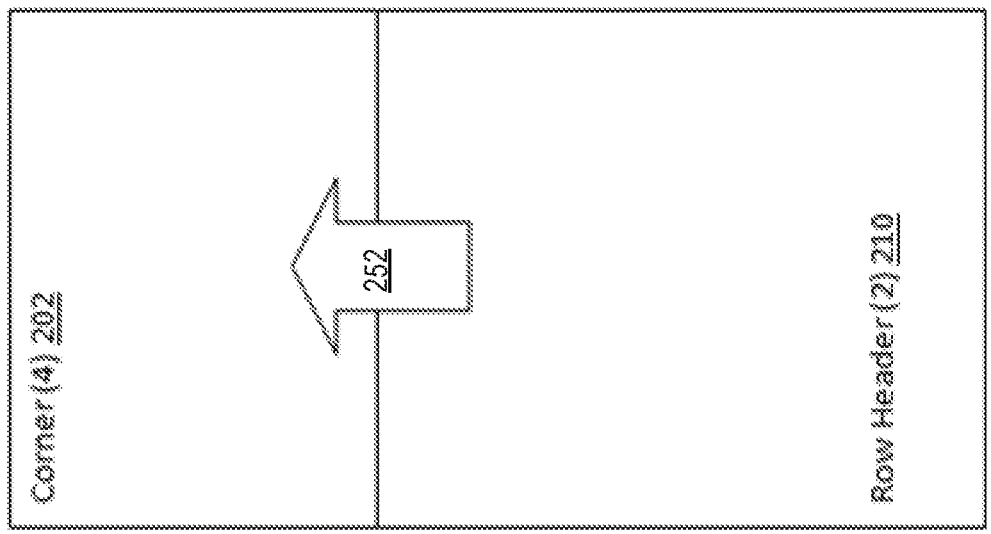

FIG. 2B illustrates a diagram 250 of a display layout for an arrangement for displaying content of an electronic document. The diagram 250 may be based on vertical scrolling in the layout shown in the diagram 200 of FIG. 2A. The sections 202, 204, 210, and 212 in the display layout of diagram 200 of FIG. 2A may be added or defined as a DOM for the document. The sections defining a table may be added to form a DOM for the document in a specific order to allow proper clipping when scrolling. In at least one embodiment, the order may be as follows: (1) databody 212, (2) row header 210, (3) column header 204, and (4) corner 202. The sticky headers basically allow the natural scrolling of the components using overflow but restricts the row header, corner and column header as needed until no more of the databody is visible. In the example of FIG. 2B, when scrolling vertically, the corner 202 and one or more column headers (e.g., a column header 204) are locked for vertical scrolling 252 of the corner and row header as well as the column header 204 and corner 202 are locked for vertical scrolling 254 until the bottom of the databody (e.g., databody 212) is reached. The row header(s) (e.g., row header 210) and databody flow under the corner and column header respectively.

Figure 2C:
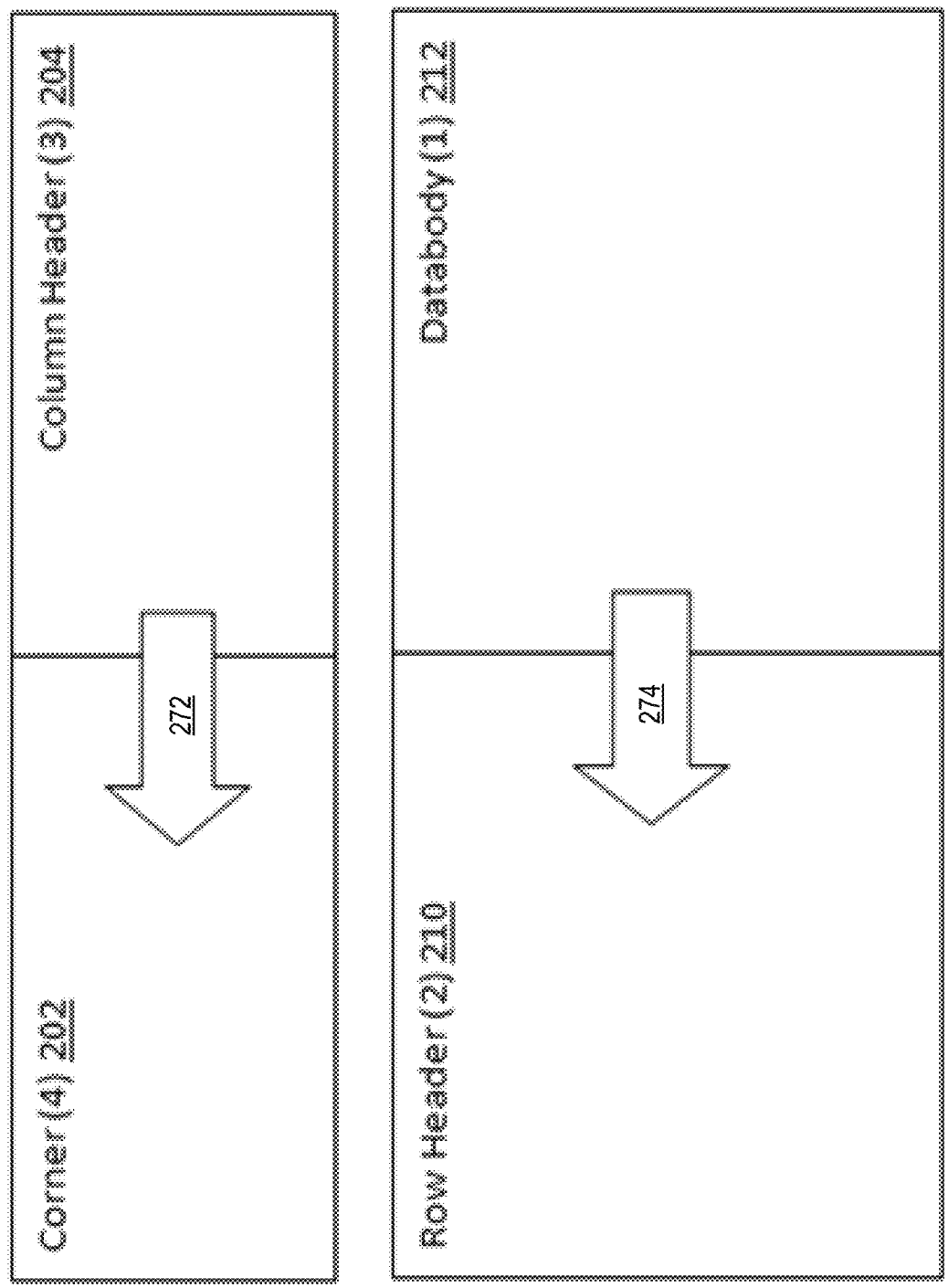

FIG. 2C illustrates a diagram 270 of a display layout for an arrangement for displaying content of an electronic document. The diagram 270 may be based on vertical scrolling in the layout shown in diagram 200 of FIG. 2A. In the example shown in FIG. 2C, when scrolling horizontally, such as scrolling 272 and scrolling 274, the corner 202 and the row header(s) 210 are locked until the right of the databody 212 is reached. The column header(s) 204 and databody flow under the corner and row header respectively.

Figure 2D:
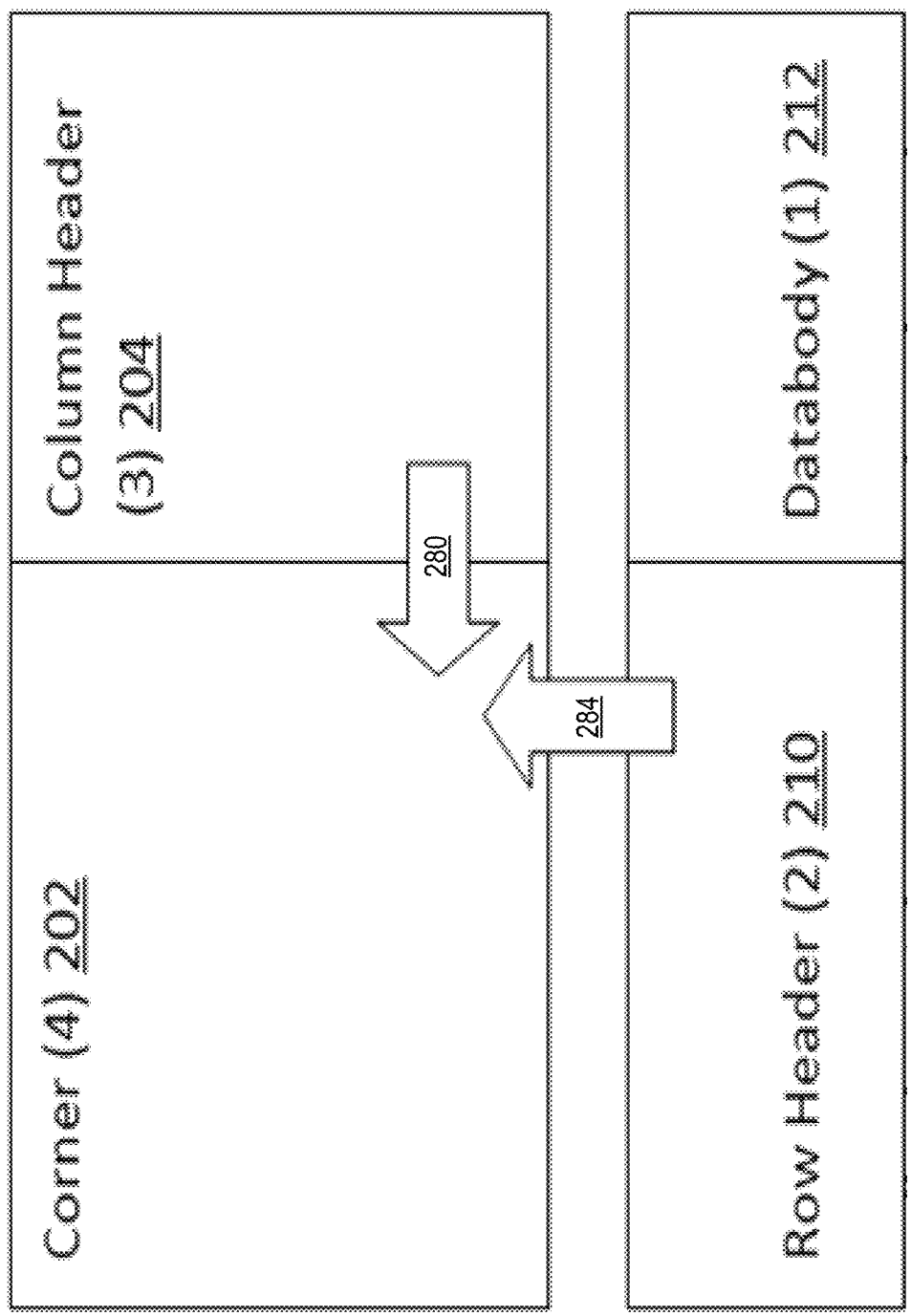

FIG. 2D illustrates a diagram 280 of a display layout for an arrangement for displaying content of an electronic document. The diagram 280 may be based on scrolling in both horizontal and vertical directions in the layout down in the diagram 200 of FIG. 2A. In the example shown in FIG. 2D, when scrolling both horizontally 284 and vertically 282, the corner 202 is locked until the bottom right of the databody 212 is reached. Note the row header 210 can scroll up and the column header 204 can scroll left. The row header 210, databody 212 and column header 204 flow under the corner 202. Eventually the sticky corner 202, row header 210, column header 204 and databody 212 are scrolled out of view. The sticky header algorithm is invoked on every scroll.

Figure 3:
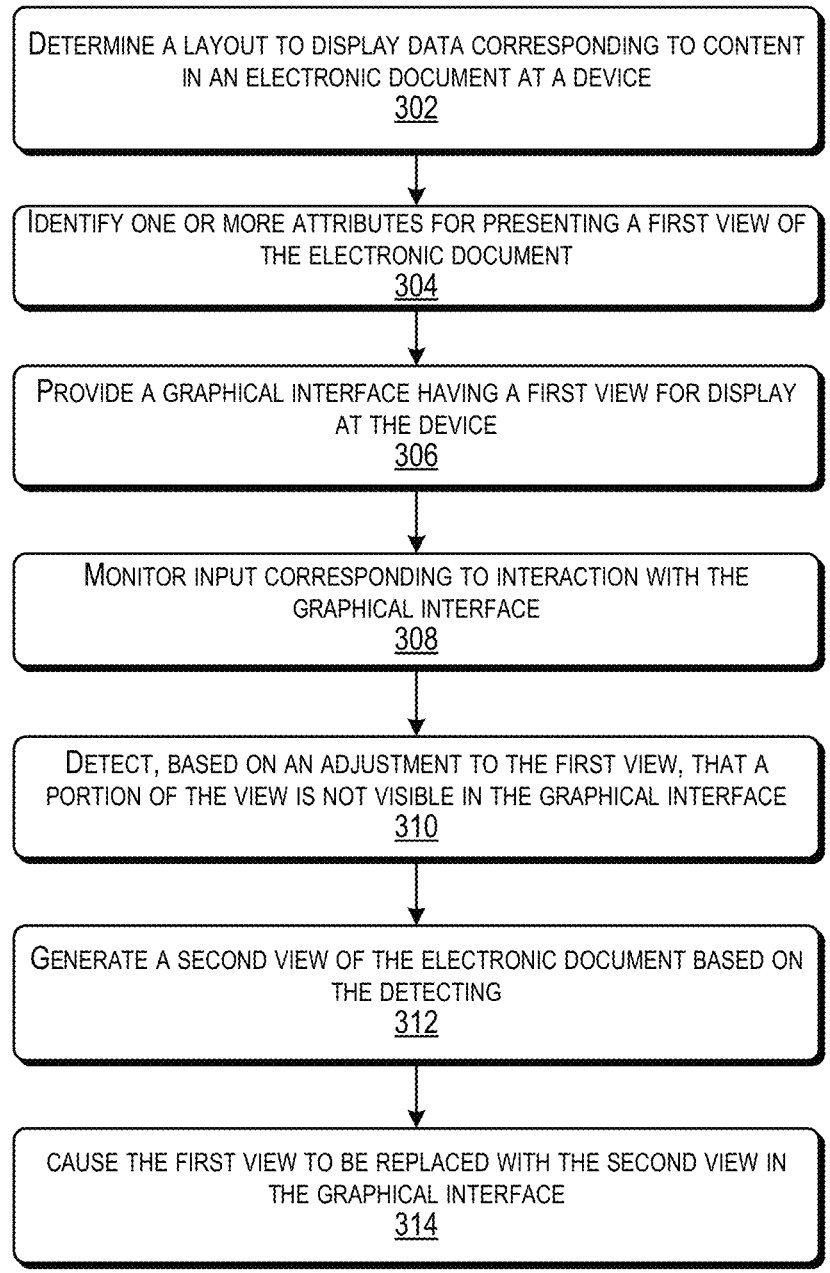
FIG. 3 illustrates a flowchart of a process according to some embodiments.

FIG. 3 illustrates a flowchart 300 of a process for managing display of content in an electronic document. Part of flowchart 300 may be implemented during design-time, when displaying data corresponding to content in an electronic document is determined. All or part of the design time may proceed a process implemented during run-time. Flowchart 300 may include steps 302-314. Some embodiments may include more or fewer steps.

At step 302, a layout to display data corresponding to content in an electronic document at a device (e.g., a client) may be determined. The content may be characters, numbers, values, and other information. Content may be accessed from one or more data sources, and/or received from another computer system. The data may be an electronic representation of the content. In at least one embodiment, the layout may be determined as part of a process implemented during design time for displaying content of an electronic document.

The layout may be a format by which the content is presented based on the data. For example, the layout may be a grid or a table. The layout may be included in or be defined by one or more headers. A header may correspond to a dimension of the data corresponding to the content. For example, a dimension may be an attribute of the data, such that the data corresponding to the dimension is presented in a view of the content on a display of the device. In at least one embodiment, the layout may include multiple headers. The headers can include a row header, a column header, or combinations thereof. A header may correspond to one or more dimensions. The layout may have an unequal number of row headers compared to column headers. Each header may be defined by multiple dimensions. For example, the layout may include a first header that is a row header and a second header that is a column header. For example, the layout may include a first header that is a column header and a second header that is a row header.

In some embodiments, the layout may be determined as part of a design process. The layout may be predetermined based on the data to be displayed including attributes defining different dimensions of the data. In at least one embodiment, the layout may be determined using techniques described with reference to FIGS. 4-9. Specifically, FIGS. 4-9 illustrate graphical interfaces for implementing a design process to configure and determine a layout for displaying data as content for display an electronic document.

Data corresponding to content can be displayed based on the dimension of the first header and the second dimension of the second header. The dimension corresponding to each header may be different, such that data may be presented based on data that matches the dimensions that intersect, such as data in a cell of a table corresponding to a dimension of a column header and a dimension of a row header. For example, a dimension may be an attribute defining a specific type, category, or aspect of data. As disclosed below, a view may be generated to display content of an electronic document using the layout. Views may be altered or generated as the view is adjusted on a display.

In at least one embodiment, a layout may have multiple sections. For example, a table or grid may be rendered in four sections, e.g., individual tables, to display content. The layout may be generated based on input to an interface to define a layout. The layout may be defined using multiple sections as disclosed herein. The sections may include headers, which are defined based on input specifying the dimension(s) of a header. The interface may enable the user to specify the size of the header including the dimensions. Content for a table may be rendered using multiple sections so that some sections, such as a header, can be adjusted based on an adjustment of displaying the content of another section, e.g., the databody or data corresponding to content. In some embodiments, content for a table may be generated for display according to a layout with headers in the document instead of headers (e.g., row or column headers) provided by an interface of an application, such as a spreadsheet application. In one example, the databody may be presented in a bottom right corner as discussed below, with a column header horizontally positioned above the databody and a row header vertically positioned to the left of the databody. In some embodiments, the layout may include a corner that is used to determine a position of the headers. In some embodiments, a table is displayed based on the layout for a document to be adjustable for view. Such embodiments may enable multiple tables to be presented in an electronic document. The headers may be part of the content such that they are floating, or move with the content rendered for a document. As explained above, the sections may be displayed using a document object model (DOM), which defines an order to allow proper clipping when scrolling. In other words, the layout of a document may be defined by a DOM.

In some embodiments, a layout may be determined by analyzing the position of content in a document for displaying the document. The position may be determined by code (e.g., JavaScript). That analyzes information such as coordinates and/or location of content in a format of the document. Header(s) and/or data may have multiple cells for displaying information. The position of the header(s) and the data may be determined. In some embodiments, a corner in between an intersection of a column header (e.g., left of a column header) and a row header (e.g., top of a row header) may be used to monitor the relative positions of the headers.

At step 304, one or more attributes for presenting a view (e.g., a first view) for display at a device may be identified. The attributes may be based on the data to be displayed and a relationship between the attributes. Each attribute may correspond to a dimension for which to display data. Each dimension may correspond to a header for which data is displayed. The attributes may be identified based on the layout for displaying the data. Each attribute may be identified with respect to a dimension. As discussed below, the attributes may be identified based on configuration of sections defining a view of data.

At step 306, a graphical interface may be provided at a device for display of a view (e.g., a first view). The view (e.g., a first view) of content in an electronic document is provided on a display in the graphical interface. Providing a graphical interface may include generating the graphical interface including the view. The interface may be the display or may be included in the display. The interface may be included in an application at a device. The view may be generated in an interface that is provided to a device. Providing the graphical interface may include performing operations to cause the view to be rendered. Providing the graphical interface may include sending the view to a device. The graphical interface may be sent in a manner that causes the device to display the view in the graphical interface. The graphical interface may be provided in response to a request from the device.

A graphical interface may be modified to display additional information or one or more additional graphical interfaces such as those described with reference to the following figures. In response to interaction with a graphical interface as disclosed herein, processing can be performed to produce the information for an updated or new graphical interface and can produce the updated/new graphical interface.

In this disclosure, "an element" may be included in a graphical interface. A graphical interface may be interactive to receive input. The input may correspond to an interaction such as an adjustment, a movement, or data provided to the graphical interface. The graphical interface may be interactive to receive input for interaction with a view or interaction to adjust or move a view presented in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface. For a computer system that displays any of the graphical interfaces disclosed herein, the computer system can receive one or more inputs corresponding to an interaction with a graphical interface. The input(s) can be processed to determine the interaction(s) to the graphical interface.

The display of a view of content in a graphical interface may be based on the size of a display at the device. The view may have a size that corresponds to the size of the display. The size (e.g., screen dimensions) of a display (e.g., a screen) may correspond to dimensions in a display area of a display at a device where the content is to be displayed. The display may correspond to a display device or a display area where a view of content is rendered. The size may be obtained from the device or a third party system. In some embodiments, the size may be determined at based on a viewable area that can be seen in an interface. The size may be less than the dimensions of a display. The size may be based on a graphical interface that is used to display the content. The size may change based on a viewable area at the time of request. In some embodiments, the size may be determined at a client and sent to display management system 150. The size may vary by client based on an area available for display.

The size may correspond to an area that is less than an area which the data corresponding to content in a document is displayable. As a result, a view may be limited to some of the data corresponding to the content to display and the headers to display with respect to the data. A view may render a portion (e.g., a first portion) of the data corresponding to the content, where the portion is rendered having the headers corresponding to the portion of the data in the view. For example, the portion may include a first header and a second header in the first view. The first header and the second header may be a row header and a column header, respectively, or vice versa. The first view may include a first databody where a first portion of the data is displayed based on a first dimension of the first header and a second dimension of the second header.

The graphical interface that presents the view may be interactive to receive input corresponding to an interaction with the graphical interface. The interaction may enable adjustment or movement of the view. A different view may be generated based on the input. For example, a first view of the content may be provided. The first view may present a portion of the data on the display. The portion may include all or some of the data corresponding to the content. The portion presented by a view may be based on the size of the display. The display may be less than a screen of a display device. The header(s) may be presented in the view based on the portion of the data that is shown. All or a portion of the header(s) may be shown based on the size. The data may be displayed corresponding to the headers which to which the data satisfies. Data may be displayed in a cell, the boundary of which may or may not be visible. The header(s) corresponding to the data may be presented based on the data that is in the view. The data corresponding to the content may include the data (e.g., labels) for header(s). The data corresponding to a header may be displayed in a cell. The cell may or may not be visible. The data corresponding to a header may correspond to each dimension of the header.

At step 308, input corresponding to interaction with the graphical interface may be monitored. The input may be monitored to detect an event corresponding to an adjustment of a view (e.g., a first view) in a graphical interface. The event may be determined based on code, or instructions (e.g., event listeners) configured to detect an event, such as an input or a change in a view. The event may correspond to input received through an interface, e.g., a graphical interface. The input may correspond to an interaction with an interactive element (e.g., scrollbar) in the interface. For example, the interaction may correspond to movement of an element in the graphical interface. The movement may cause an adjustment to the first view in a vertical direction. The first header that changed may be a row header and the second header is a column header that is static. In another example, the interaction corresponds to movement of an element in the graphical interface. The movement may cause the adjustment to the first view in a horizontal direction. The first header that changed may be a column header and the second header may be row header that is static. The interaction may be an adjustment of a view to change the view to a different view to see a different portion of the data corresponding to content in a document. The different portion may include some of the portion in the view currently on the display. The input may be monitored to determine that a portion of the first view is not visible in the graphical interface due to the adjustment to the first view. The portion that is not visible may include any of the headers, and/or the data corresponding to an attribute represented by the header.

At step 310, based on an adjustment to the first view detected by monitoring input to the graphical interface, a determination is made that a portion of the first view is not visible in the graphical interface due to the adjustment to the first view, where the portion of the first view includes a header. The adjustment of the first view may be processed to determine a change to the data and/or the header(s). In some embodiments, code, or instructions may be implemented to monitor interaction to track movement of the sections in a layout of the first view.

A portion of a view (e.g., a current view) may be detected as not being visible on the display based on an event corresponding to an adjustment of the first view on the display. The portion of the view that is detected as not visible may correspond to one or more headers, the portion of the data in the view, or a combination thereof. For example, the portion of the view that is detected as not being visible on the display may be due to a display size that is less than a view capable of displaying all of the data. As a result of the event, a portion of the header(s), the data in the view, or a combination thereof may not be visible.

In some embodiments, the portion of the view is detected as not visible based on monitoring a position left of a column header and top of row header table is updated. Upon determining that the height or width is same as the size of the headers (e.g., column header height or row header width) the view is not modified or updated. However, upon determining that the height or width is greater than the size of the headers (e.g., column header height or row header width) the view may be modified or updated based on the event. The position of the corner based on the adjustment of the view may be used to determine the position of the headers and the databody corresponding to the headers. For example, the position of the corner may similarly updated when size of view is less than the header tables size.

At step 312, based on the detecting, a second view of the electronic document at the device may be generated. The second view may present a second portion of the data corresponding to the content, where the second portion is determining based on the detected portion. The second view may include a second databody where the second portion of the data is displayed. The second portion may include some of the first portion of the data. The second portion may be presented as a change corresponding to the first header based on the detected portion of the first view. The second view may present the second header as rendered in the first view.

An updated view (e.g., a second view) of the content in the electronic document on a display may be generated. The updated view may be a newly generated view or may be a view that is updated based on the view provided in the graphical interface at step 306. The techniques disclosed herein enable multiple views of an electronic document to be generated based on one or more events, e.g., an adjustment to a view. The view may be generated as a portion (e.g., a second portion) of the data on the display. The portion may be different than the portion of the data in the view prior to the event. The portion may include some of the data. The second portion may be determined based on modifying the first portion according to the detected portion. In one example, the second portion may be presented as a change corresponding to the first header based on the detected portion and may be presented with no change to the second header. The change corresponding to the first header may be based on the change corresponding to the first header, the data, or a combination thereof based on the detected portion. The second portion may be presented with a modified first header for the change corresponding to the first header based on the detected portion of the first view. The modified first header in the second view may represent the first dimension for the second portion of the data.

In some embodiments, the second view may be generated as an update to the first view. The adjustment of the first view may be processed to determine a change to the data and/or the header(s). In some embodiments, the position or location of the header(s) and data corresponding to content may be identified by analyzing the metadata of the document. The document may include or be associated with a layout that can be used to determine the position. In some embodiments, a corner in the layout may be used to determine the relative position of the header(s) and the data. An adjustment that is detected may be used to adjust the corner, based on which the header(s) and the data may be adjusted. In some embodiments, a portion of the header(s) and/or the data that are in the first view may be modified such that a part of the portion is not visible in a second view based on the adjustment. In some embodiments, the headers(s) and the data that are hidden in the second view are placed behind the view of the portion of the second view that are visible. For example, the portion of the data and the header(s) that are not to be visible may be hidden behind the header(s) that have not changed to create the appearance of scrolling movement without changing the appearance of the header that is needed to understand the dimension of the data.

At step 314, the first view in the graphical interface may be replaced by the second view generated at step 312. The second view may be provided to replace the first view provided on the display. The first view may be replaced by the second view. In some embodiments, the first view may be updated to the second view. The view may be provided in real-time to show the adjustment corresponding to the event. The graphical interface may be regenerated or updated to replace the first view with the second view. The view and/or the graphical interface including the view may be provided to the device. Providing the view may cause the graphical interface to be updated to display the second view.

In at least one embodiment, a process is disclosed for managing display of content. The process may include accessing content to render at a display device. The process may include determining a layout of the content. Based on the layout of the content, an electronic document may be generated having a plurality of sections, one or more of the plurality of display sections generated to include data of the content, where the electronic document is generated with one or more headers. Each of the headers may correspond to a different section of the plurality of display sections. The content to be rendered in the electronic document at the display device. Movement in displaying the content to render the electronic document may be detected. A section of the plurality of sections may be adjusted based on the movement that is detected. In some embodiments, detecting the movement in display the content may include: monitoring one or more coordinates of a display of the content in the electronic document; and based on the monitoring, determining that content related to a header of the one or more headers has moved. Adjusting the section may include determining an adjustment of the section based on the content that has moved. The one or more headers can include a column header or a row header.

In some embodiments, multiple views may be generated, each corresponding to an event related to an adjustment to a view. The views may be generated until all portions of the content are not visible. In some embodiments, a view may be displayed to present data corresponding to first content and data corresponding to second content. Each of the different content may have different data and different headers. In some embodiments, a view may be generated to include a portion of the first content and a portion of the second content. The techniques disclosed in this process may be applicable to multiple content (e.g., tables), portions of which may be presented in a single view. Based on detecting events, such as an adjustment to a view, the view presenting a portion of the first content and the second content may be adjusted as disclosed herein for a single view. In some embodiments, based on an adjustment to a view, the portion of content displayed in a view may include one or more header(s), but not data. The data may be visible as further adjustments in the view are made.

III. Graphical Interfaces for Displaying Content and Managing Display of Headers FIGS. 4-9 illustrate graphical interfaces for displaying content and managing display of headers according to some embodiments. The examples of graphical interfaces shown in FIGS. 4-9 may be provided in an application (e.g., Enterprise Performance Reporting) that can be used to manage display of content. The various graphical interfaces show examples of features enabling a user to manually or automate generation of content for display. The graphical interfaces may be provided during design time, runtime, or both for displaying content. The application may enable a user to specify one or more sources of data. Data may be specified for each section, or individual table. The application may generate an electronic document for display based on the layout of content. Content may be laid out as described in FIGS. 2A-2D. Content broken down into sections may enable display management system 150 to manage display of headers based on movement of data in the databody section.

Figure 4:
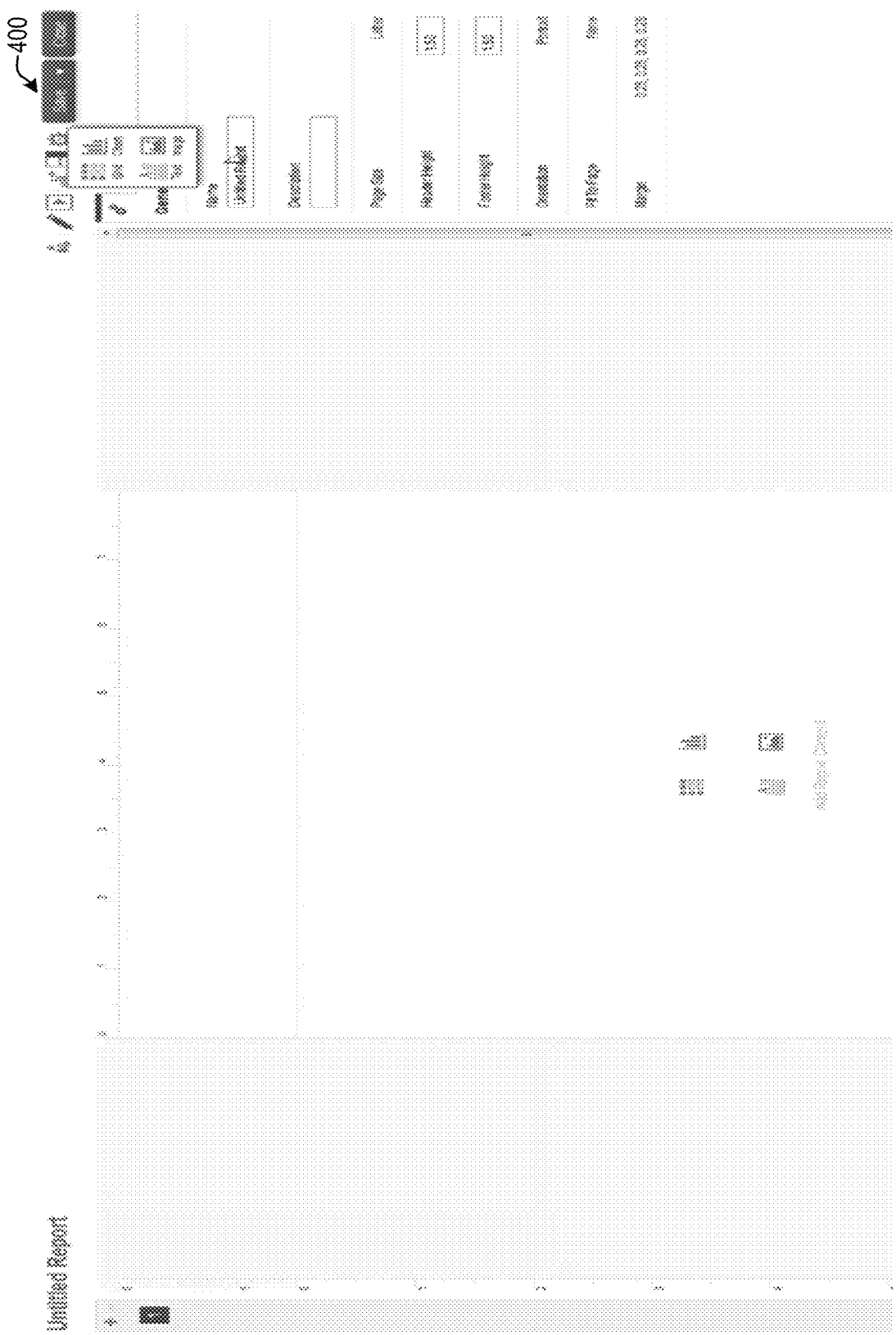
Figure 5:
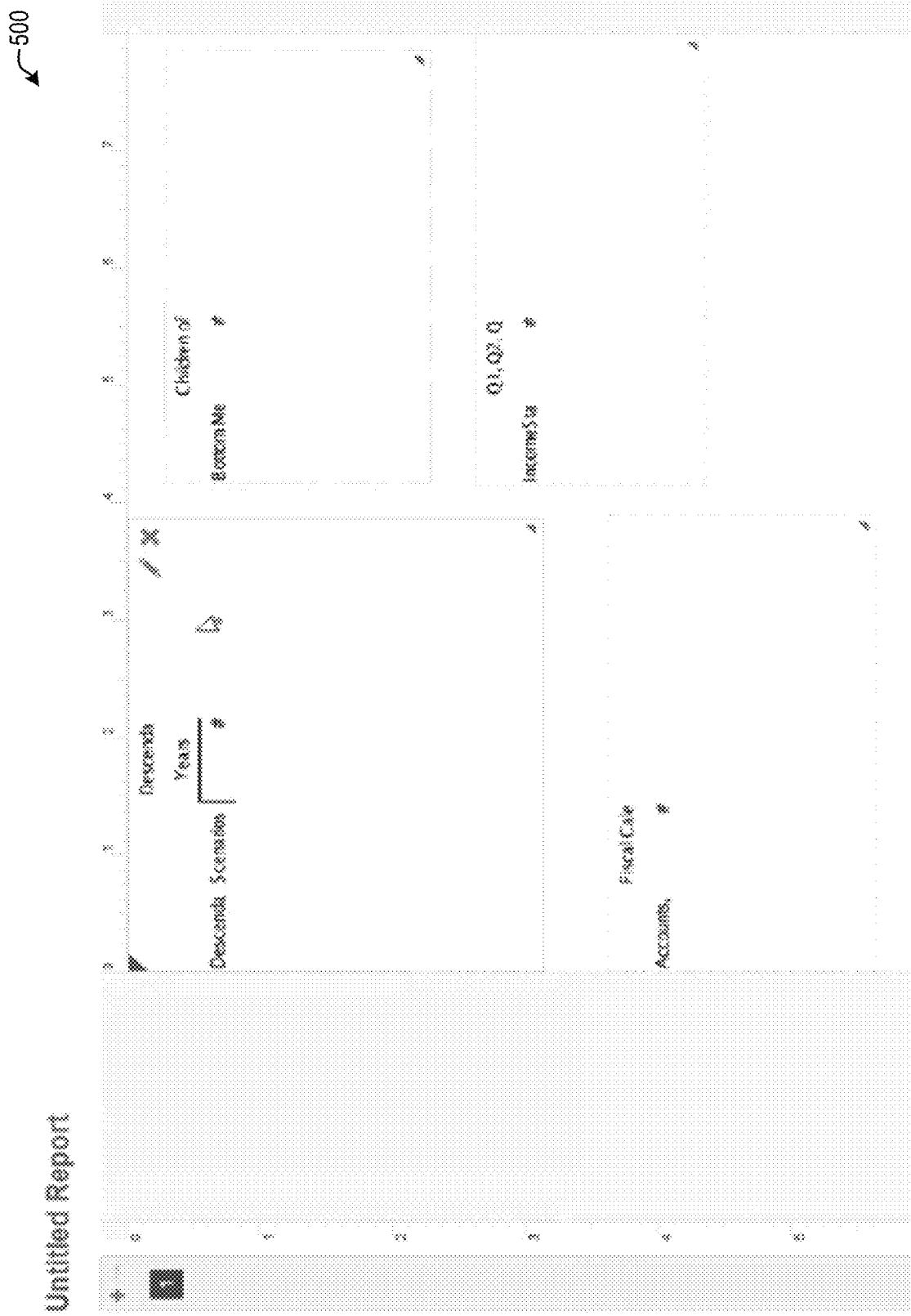

FIG. 4 illustrates a graphical interface 400 that may be provided at design time to determine a layout for displaying content in an electronic document. The graphical interface 400 may include one or more elements to select a layout (e.g., a table) for displaying content and defining the sections in the layout. FIG. 5 illustrates a graphical interface 500 that is provided based on interaction with graphical interface 400. Graphical interface 500 displays a layout for content in a document based on sections, each corresponding to an attribute for which to display data as a document. Each of the sections (e.g., descendants, children, fiscal, and income) may be configured via one or more elements in graphical interface 500.

Figure 6:
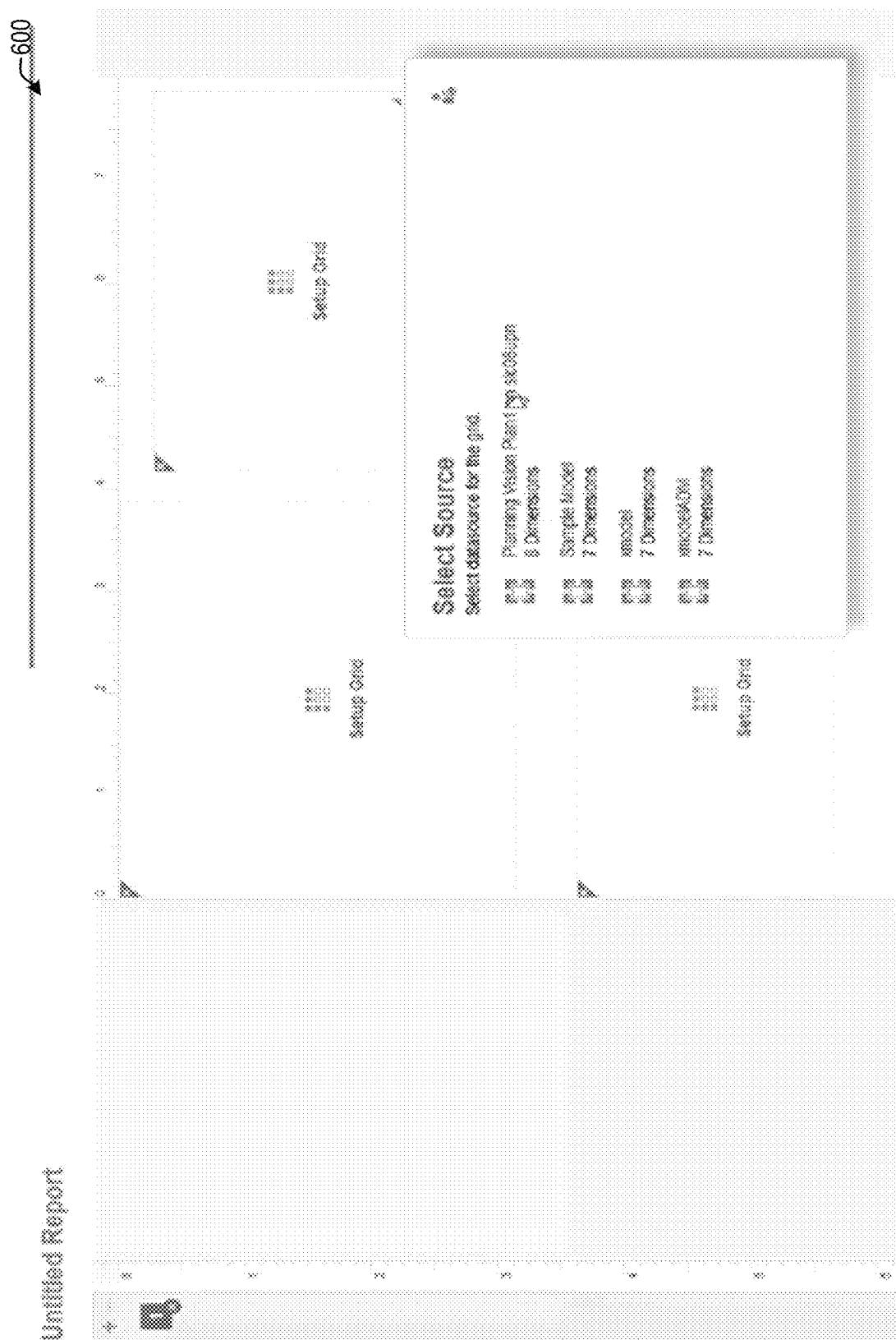
Figure 7:
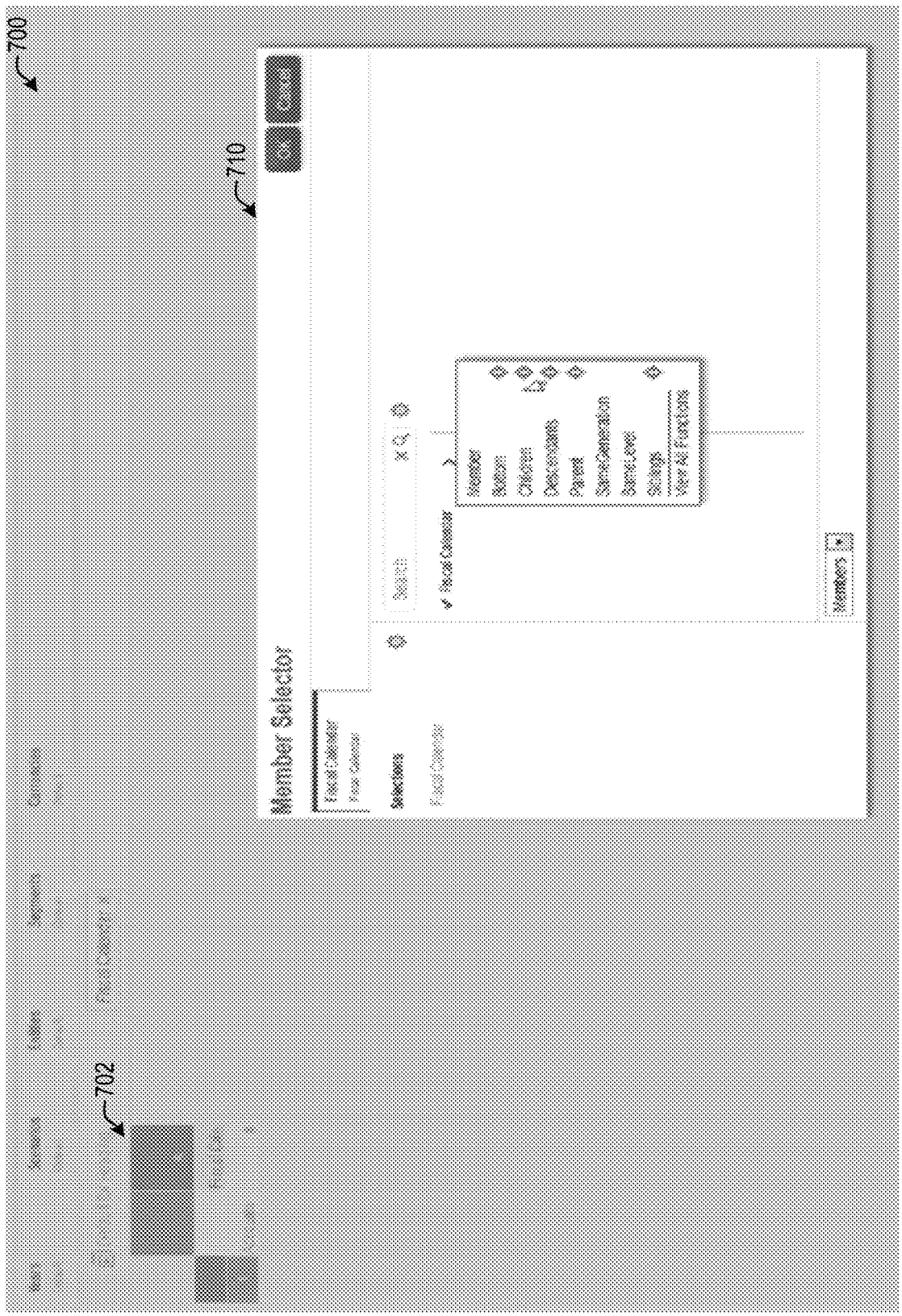

FIG. 6 illustrates a graphical interface 600 for specifying one or more data sources for data to display content for a document. One or more data sources may be specified for providing data for the sections. The sections may correspond to a layout based on dimensions defined by attributes for those sections. FIG. 7 illustrates a graphical interface 700 displayed based on interaction with graphical interface 600. Graphical interface 700 may display a table 702 having a layout defined by the sections shown in FIG. 6. Graphical interface 700 may be interactive to display a graphical interface 710 to configure a relationship of the sections for the layout, such as the relationship of attributes between each of the sections.

Figure 8:
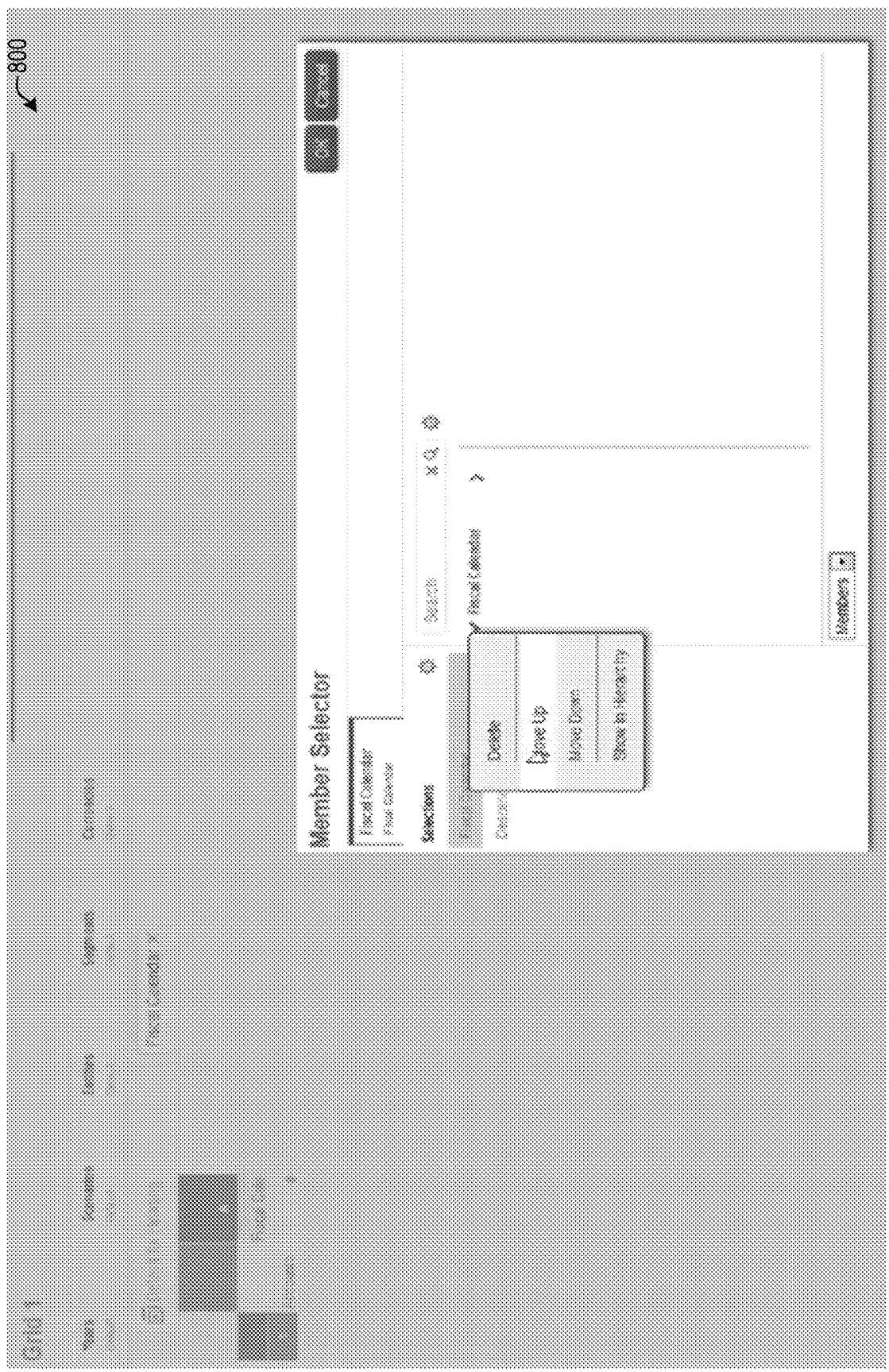
Figure 9:
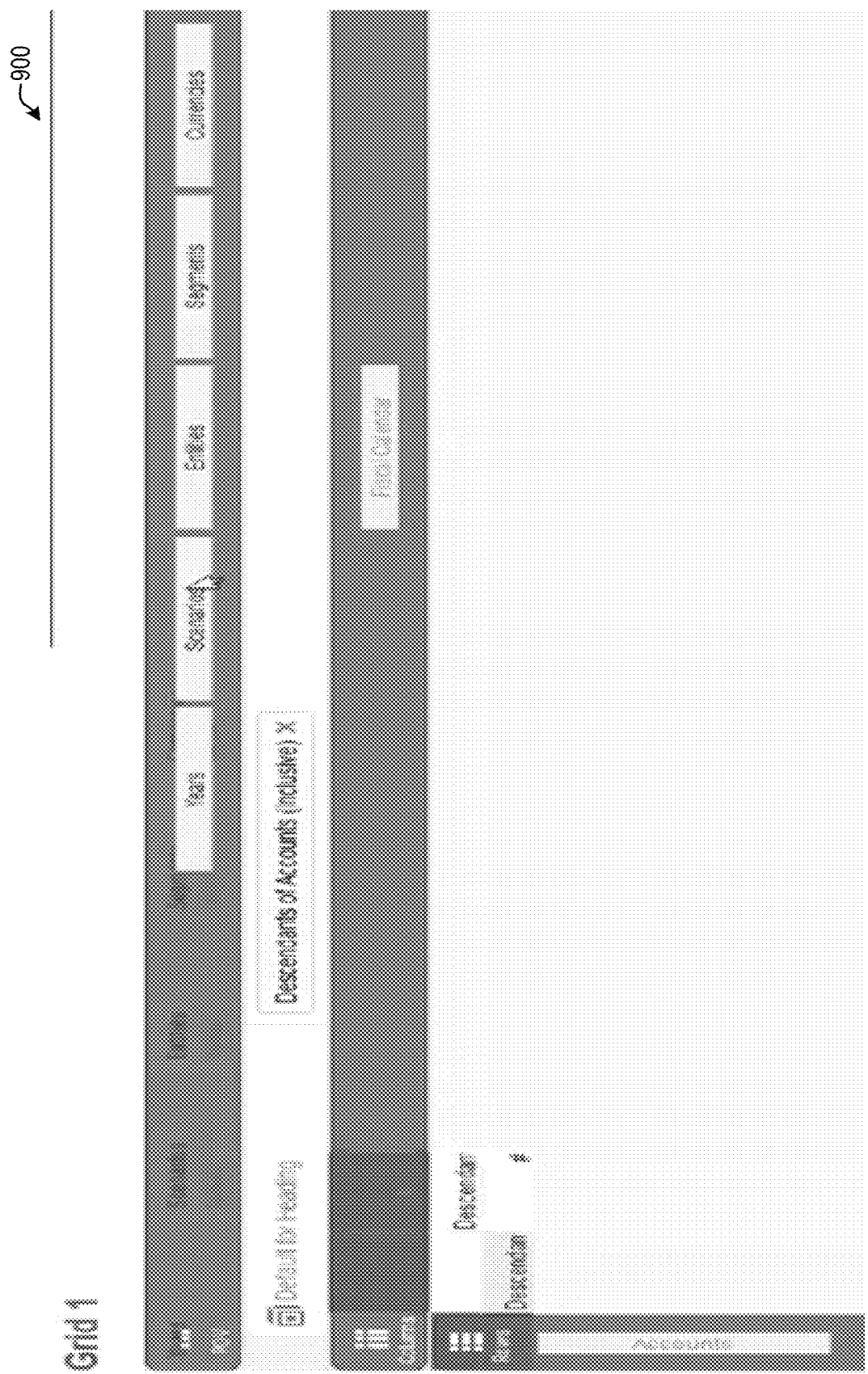

FIG. 8 illustrates a graphical interface 800 for configuring the sections in the layout for content in a document. Specifically, graphical interface 800 may be interactive to receive input to configure an order, relationship, or arrangement of attributes corresponding to sections in the layout. FIG. 9 illustrates a graphical interface 900 rendering a view of a layout for displaying content for a document. The view is should with a row header ("accounts") and a column header ("fiscal calendar") to represent multiple attributes for dimensions in the content.

FIGS. 10-21 illustrate graphical interfaces for displaying content and managing display of headers. Additional examples of graphical interfaces are disclosed in priority applications 1) U.S. Provisional Application No. 62/396, 065, filed Sep. 16, 2016 entitled "TECHNIQUES FOR MANAGING DISPLAY OF HEADERS IN AN ELECTRONIC DOCUMENT"; and 2) U.S. Provisional Application No. 62/428,470, filed Nov. 30, 2016 entitled "TECHNIQUES FOR MANAGING DISPLAY OF HEADERS IN AN ELECTRONIC DOCUMENT." The features illustrated in the FIGS. 10-21 disclose functional, industrial design, use interface aesthetic and ornamental aspects. Specifically, the layout, arrangement, and location of elements in each of the figures and the overall appearance of each graphical user interface (GUI) can take other forms based on ornamental, aesthetic, industrial design, functional and combinations thereof while maintaining similar operational characteristics. For example, such as those embodiments disclosed herein, each header in the display of a GUI can be shown with shading, one or more lines, and/or any other type of aesthetic, ornamental, or industrial design. Each header may include one or more lines identifying multiple sections, each section corresponding to a title or a label for data corresponding to that title or label such as a column or a row corresponding to the title/label in the header. Data in a databody of a table may be shown with one or more lines or other visual appearance to identify different data corresponding to different titles/labels in a header. The line(s) may be shown for a table or other design for display of data. Each field or cell may be displayed with a border or other appearance indicating a distinct item of data in the databody. The lines (e.g., solid and broken) shown in the graphical interfaces for the view, patterns, and characters are for illustrative purposes only and do not affect functionality. The shading showing on the display screen depicts the selective movement of the data table headers for the animated graphical user interface. The illustrations in FIGS. 10-21 are for illustration only without affecting the functionality of the embodiments described and illustrated. The illustrations may include more or fewer elements or components. A change in appearance of the display does not affect the functionality of the graphical interface including view in the illustrations. Although shown as a single element, a header may include or appear as multiple elements (e.g., cells) defined by a border or other appearance, each corresponding to an attribute of a dimension for data. The data, such as each value shown in a databody, may correspond to a field or cell that defines data corresponding to a dimension or attribute in the row header and the column header. In some embodiments, each GUI may include a portion that does not have data such as a "corner." The header in a table may be illustrated as a design that is animated in a graphical user interface relative to movement of data and/or other header(s).

FIGS. 10-15 illustrate vertical scrolling wherein a header (e.g., column header) on at the top of each table remains fixed, but then adjusts to be visible so long as data in the table is visible. A row header on the left remains visible until data for a portion of the row header is no longer visible. The graphical interface may appear animated, such that the display is adjusted to display headers according to data that is visible. Specifically, FIGS. 10-15 show that header 124 adjusts to 224, 324, 424, and 524 of FIGS. 2-5, respectively, and header 344 of FIG. 12 adjusts to 444, 544, and 644 of FIGS. 13-15, respectively, as a user scrolls vertically. Headers 126 and 346 remain visible so long as the databody for the headers is visible.

Figure 10:
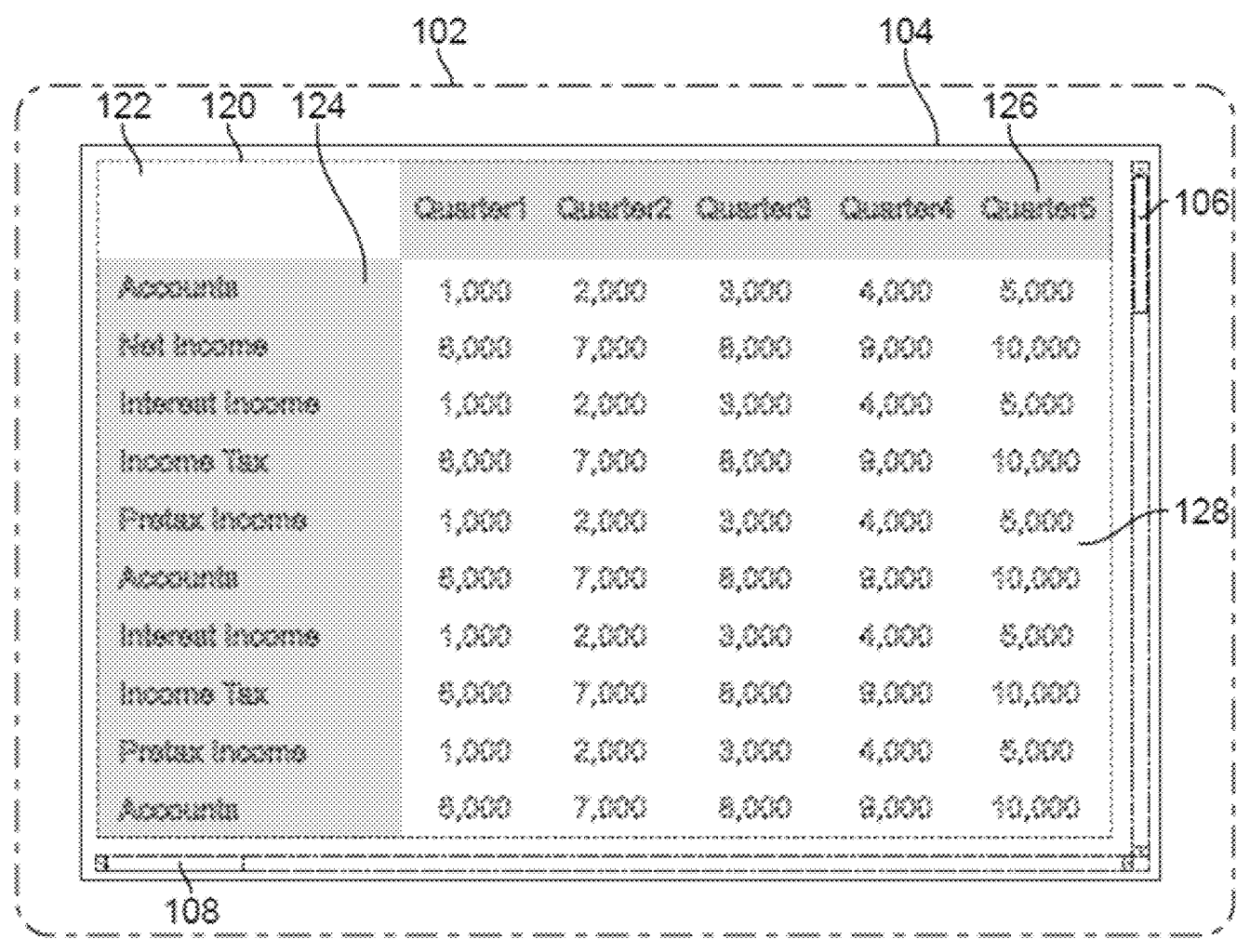

FIG. 10 illustrates a graphical interface 102 including a view 104 for display content in a document. View 104 may include one or more layouts, such as layout 120, which defines a structure of displaying data in the view 104. Layout 120 may be defined by multiple sections, such as a corner 122, a column header 126, a row header 124, and a databody 128. Although shown as a single element, a header may include or appear as multiple elements (e.g., cells) defined by a border or other appearance, each corresponding to an attribute of a dimension for data. The data, such as each value shown in the databody 128, may correspond to a field or cell that defines data corresponding to a dimension or attribute in the row header 124 and the column header 126.

Graphical interface may be interactive to receive input to adjust the view. For example, view may include element 106 (e.g., a vertical scroll bar) and element 108 (e.g., a horizontal scroll bar). Each element may be interactive to change the portion of the databody in the view 102 with respect to the headers 124, 126. The content shown in databody 128 may include a portion of the content in a document. The row header 124 and column header 126 may be shown corresponding to the portion of data shown in databody 128 which satisfies the attributes in the dimension represented by those headers 124, 126.

Figure 11:
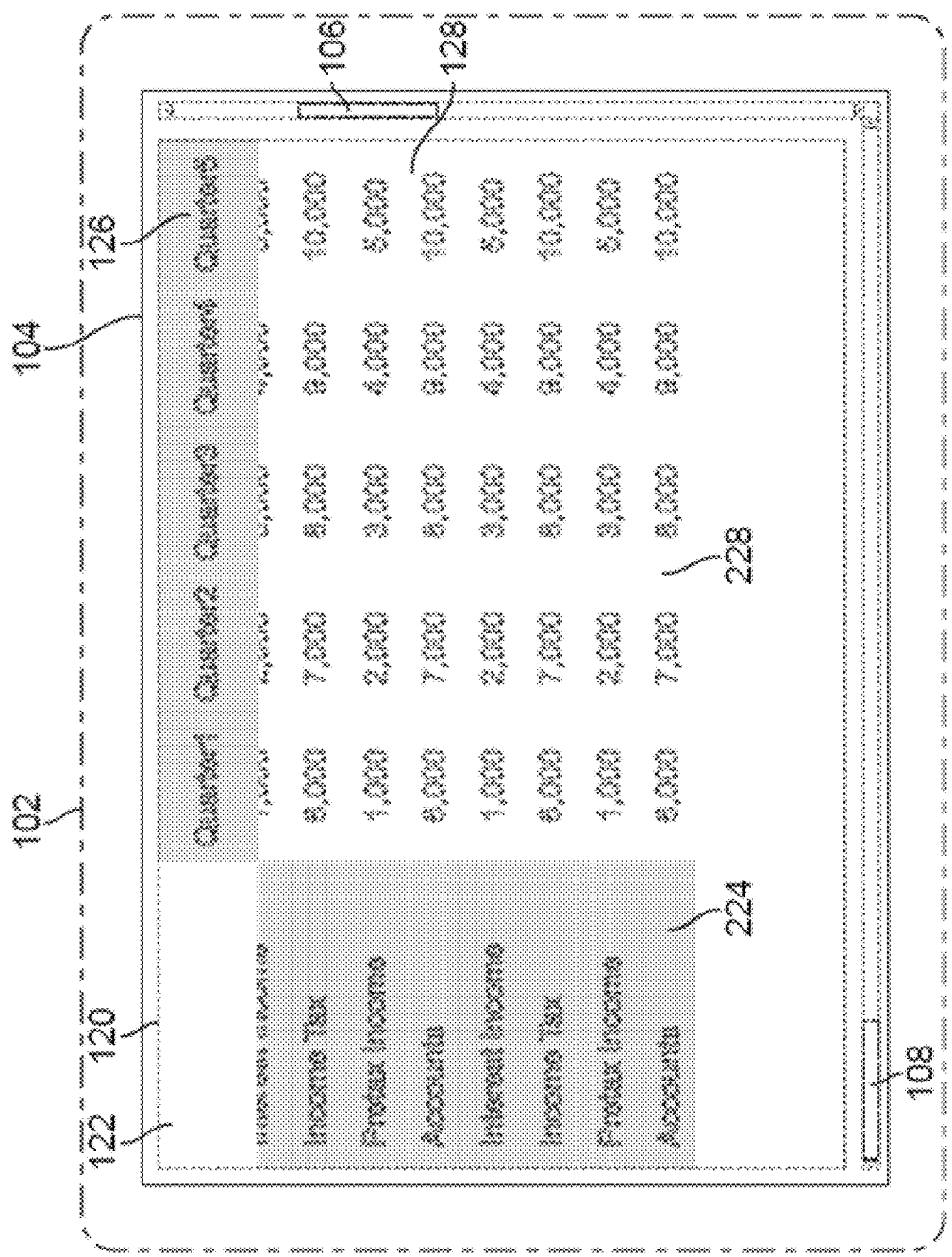

FIG. 11 illustrates graphical interface 102 rendered based on a change in the view 104 to an updated, or new view based on input corresponding to interaction (e.g., scroll down) with element 106. Databody 128 changes to display different data including a portion of data shown in FIG. 10. Header 126 may remain stationary as the dimensions in header 126 correspond to the data in each column of the databody, which has changed due to vertical scrolling. Header 124 of FIG. 10 may change to header 224 of FIG. 11 to display the dimensions corresponding to the rows of data shown in databody 128. View 104 may be updated to reflect a change in header 224, which displays portions of dimensions corresponding to a portion of the row in databody 128. Databody 128 may be modified to display new data 228 corresponding to rows that are in view based on vertical scrolling. Row header 224 may adjust corresponding to rows as they become visible while column header 126 remains stationary.

Figure 12:
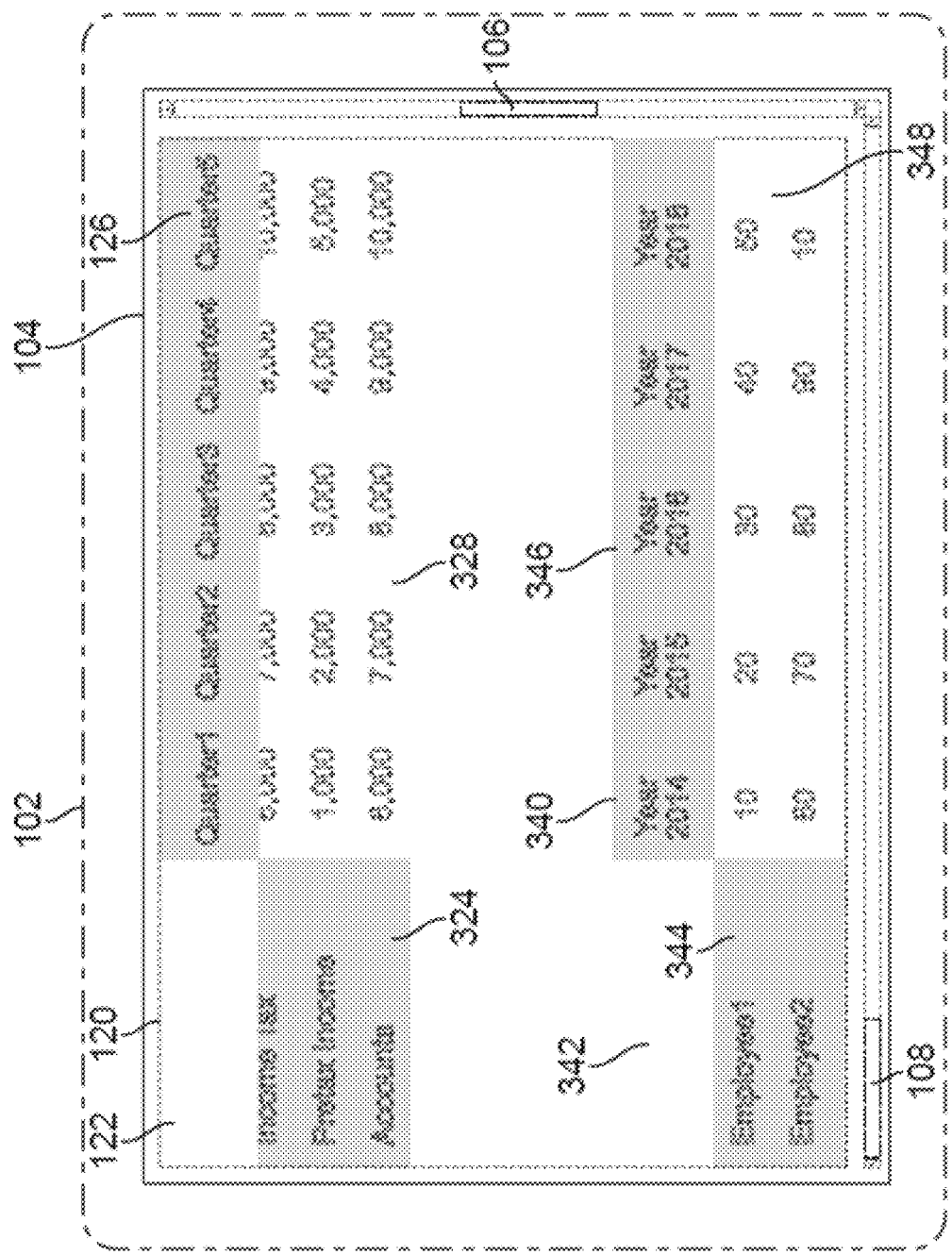

FIG. 12 illustrates graphical interface 102 rendered based on a change in the view 104 to an updated, or new view based on input corresponding to continued interaction (e.g., scroll down) with element 106. Databody 128 changes to display different data including a portion of data shown in FIG. 11. Header 126 may remain stationary as the dimensions in header 126 correspond to the data in each column of the databody, which has changed due to vertical scrolling. Header 224 of FIG. 11 may change to header 324 of FIG. 11 to display the dimensions corresponding to the rows of data shown in databody 328. View 104 may be updated to reflect a change in header 224, which displays portions of dimensions corresponding to a portion of the row in databody 128. Databody 128 may be modified to display new data 328 corresponding to rows that are in view based on vertical scrolling. Row header 324 may adjust corresponding to rows as they become visible while column header 126 remains stationary.

FIG. 12 illustrates another portion of layout 120 including more sections of data for a document. Graphical interface 102 may be updated to display what is shown in FIG. 12 based on interaction with element 106 in FIG. 11. Layout 120 in view 104 may be updated to display different content for a document in a different databody 348. The content may be displayed in another table 340 defined by sections, such as a corner 342, column header 346, row header 344, and databody 348. Table 340 may be displayed in the same view 102 having other tables. Header 344 may be generated to display fields with respect to databody 348 shown in layout 102. Header 346 may remain the same.

Figure 13:
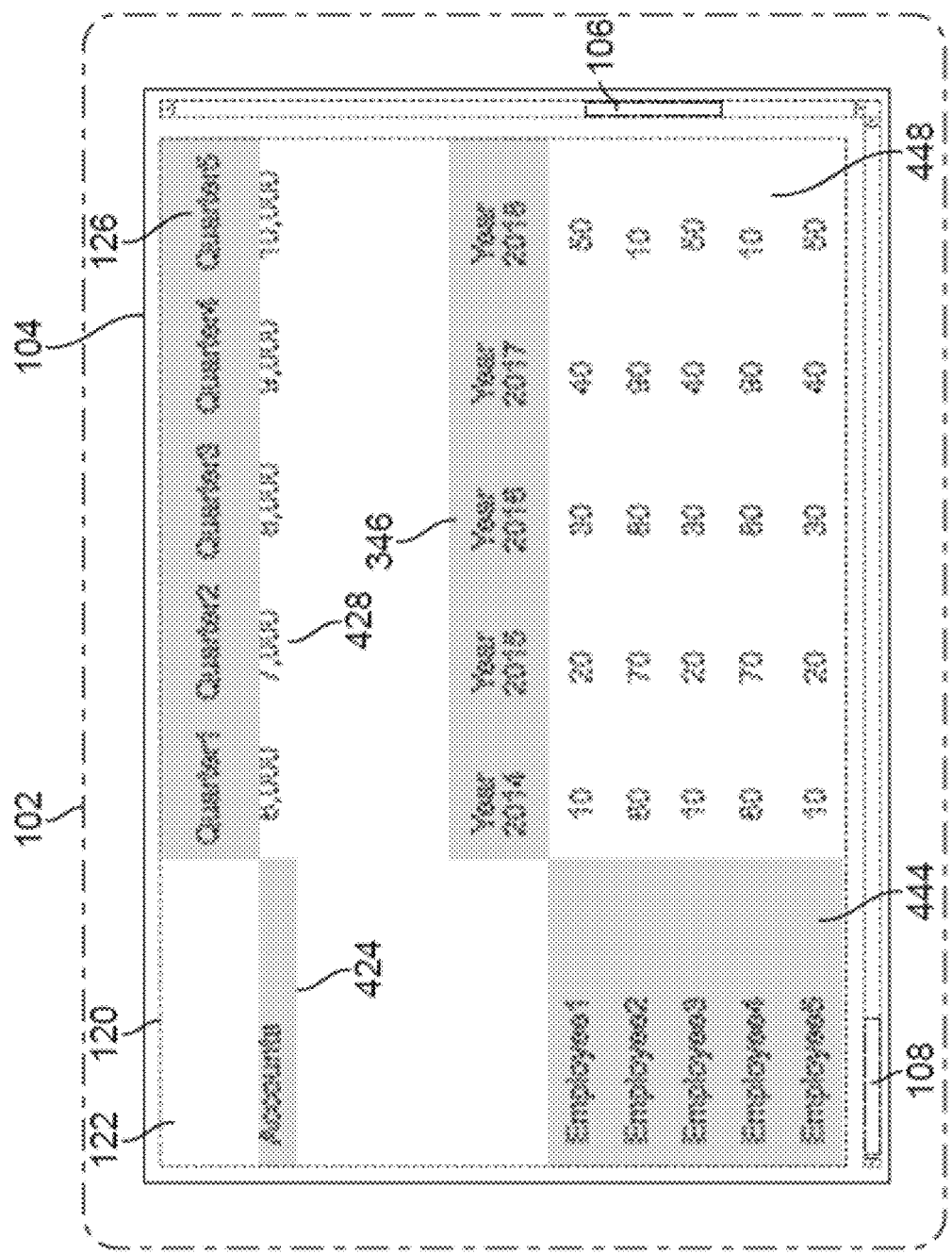
Figure 14:
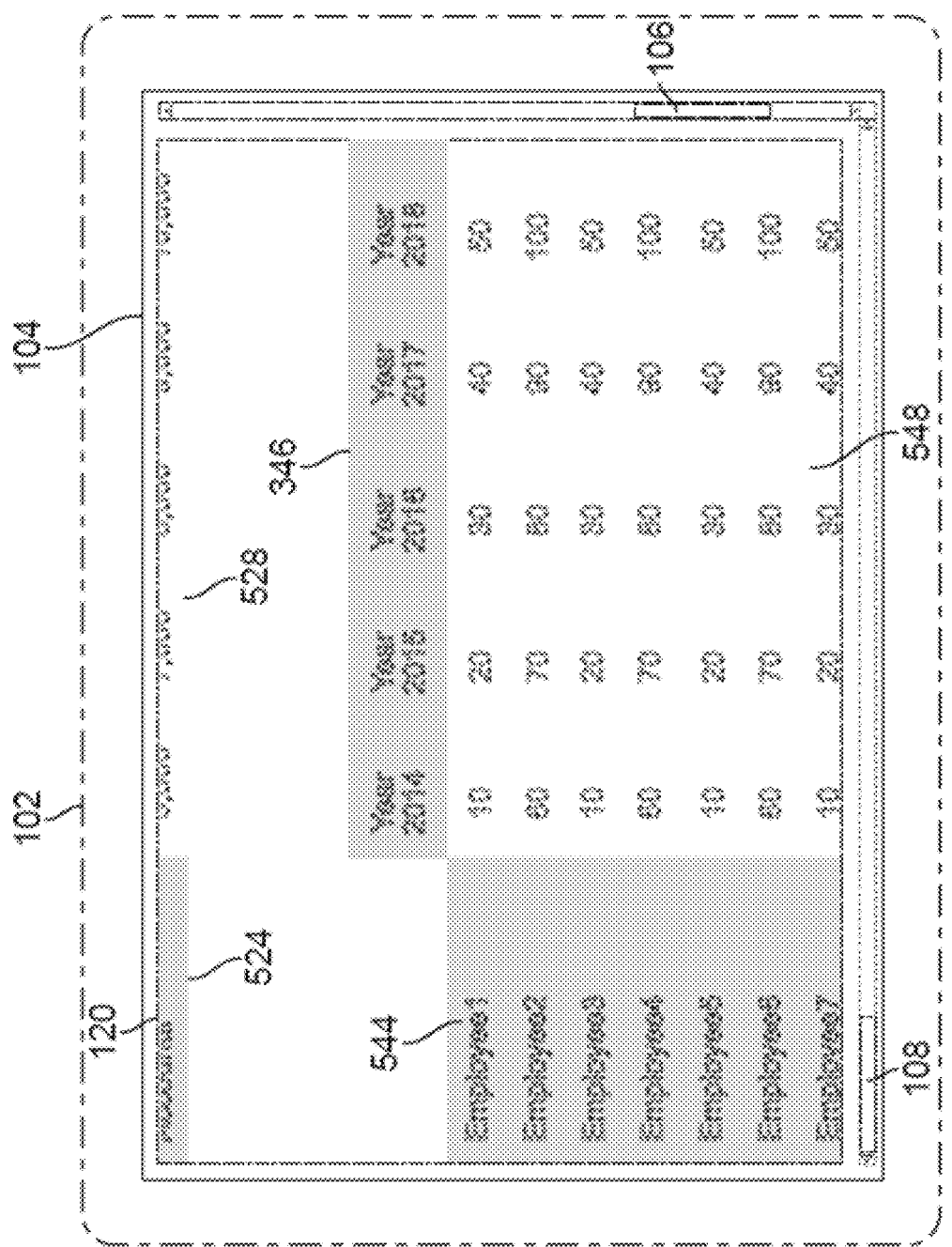
Figure 15:
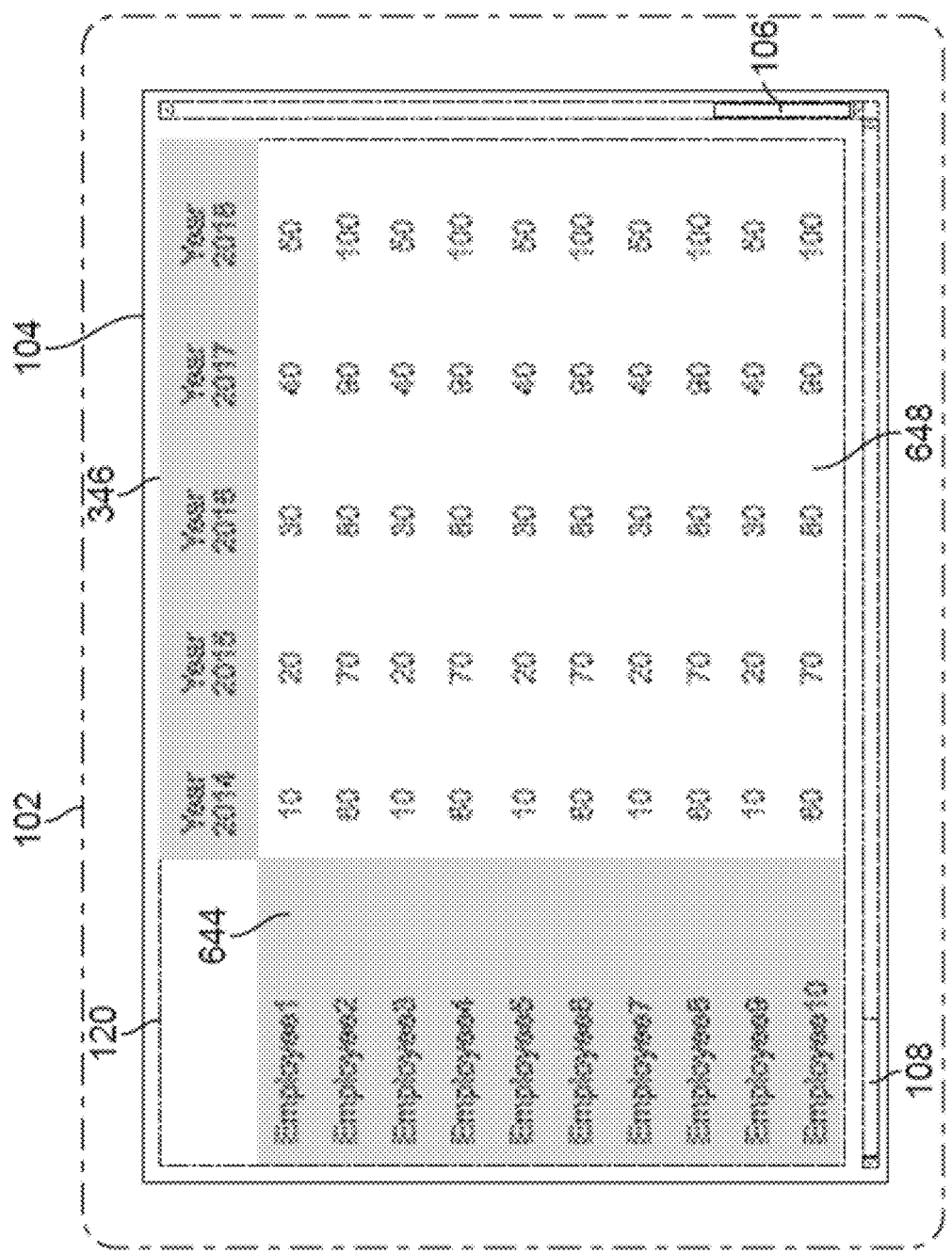

In FIG. 12, databody 348 changes to databody 448 to show the remaining data for a first table. Header 344 changes to header 444 to show the attributes matching the data shown in databody 448. FIGS. 13-15 show changes in the table 340 with respect to databody 348 originally in FIG. 12. As the user scrolls element 106, databody changes from 348 to 448, 548, and 648 in FIGS. 13-15, respectively, while adjusting header 344 to 444, 544, and 644 in FIGS. 13-15, respectively. Column header 346 remains unchanged while column header 344 changes from its original presentation to appear sticky by showing only those dimensions or portions thereof corresponding to the data for those dimensions in the databody 348.

Figure 16:
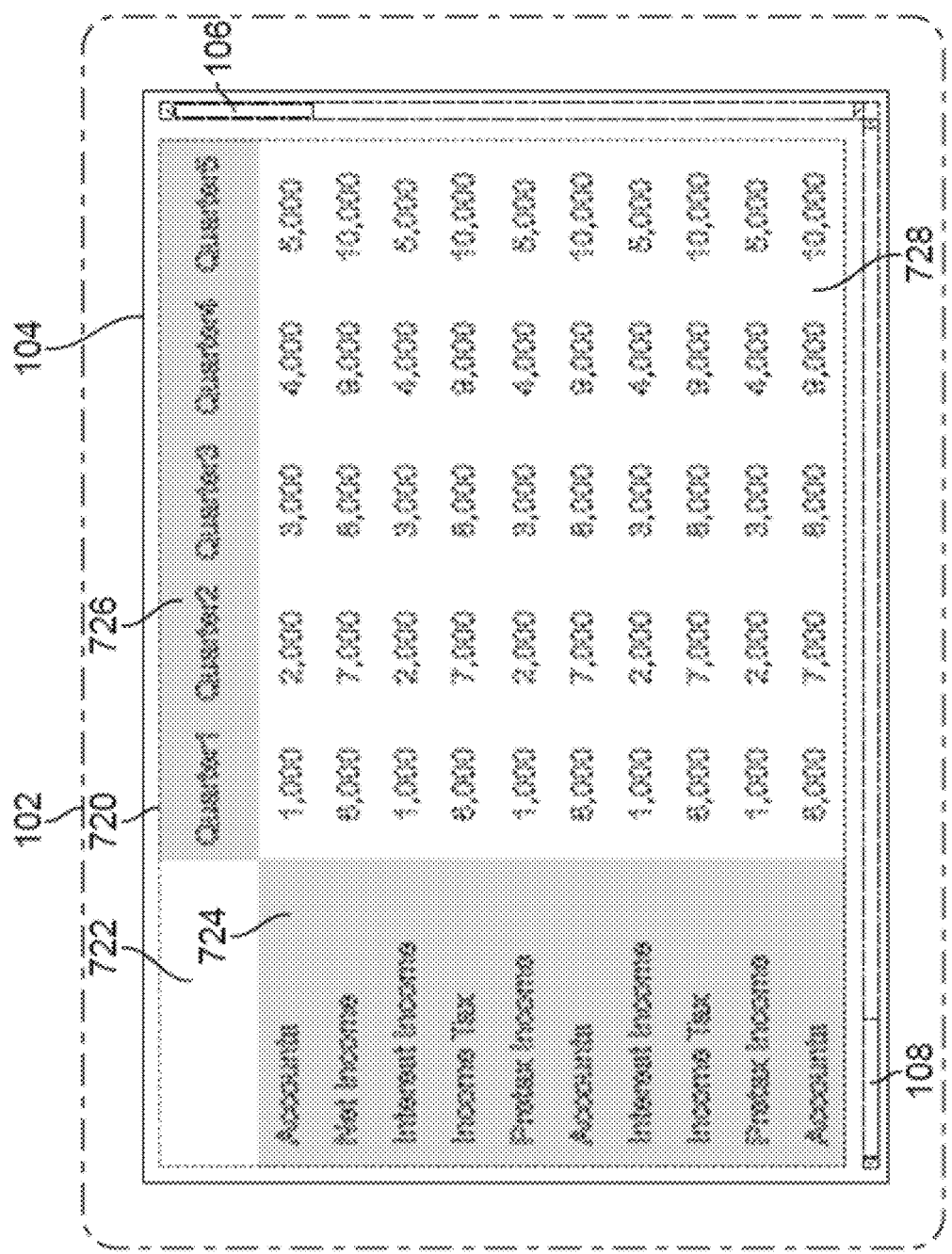

FIGS. 16-21 illustrate horizontal scrolling wherein a header (e.g., row header) on at the top of each table remains fixed, but then adjusts to be visible so long as data in the table is visible. A column header on the top remains visible until data for a portion of the column header is no longer visible. The graphical interface may appear animated, such that the display is adjusted to display headers according to data that is visible. FIG. 16 illustrates a graphical interface 102 that includes a view 104 of content for a document. View 104 may be defined by a layout 720, which defines a structure of displaying data in the view 104. Layout 120 may be defined by multiple sections, such as a corner 722, a column header 726, a row header 724, and a databody 728. Although shown as a single element, a header may include or appear as multiple elements (e.g., cells) defined by a border or other appearance, each corresponding to an attribute of a dimension for data. The data, such as each value shown in the databody 728, may correspond to a field or cell that defines data corresponding to a dimension or attribute in the row header 724 and the column header 726.

Figure 17:
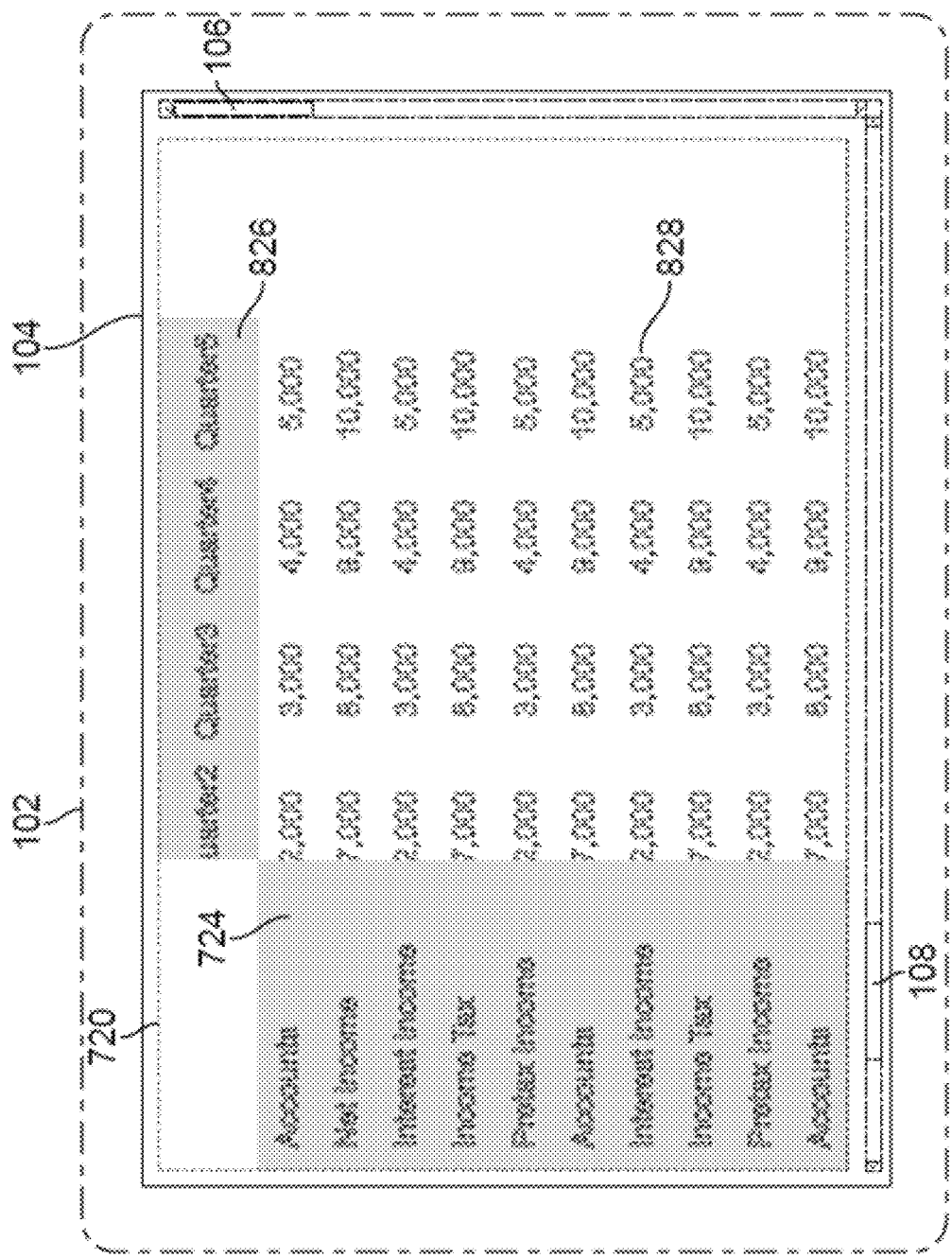
Figure 18:
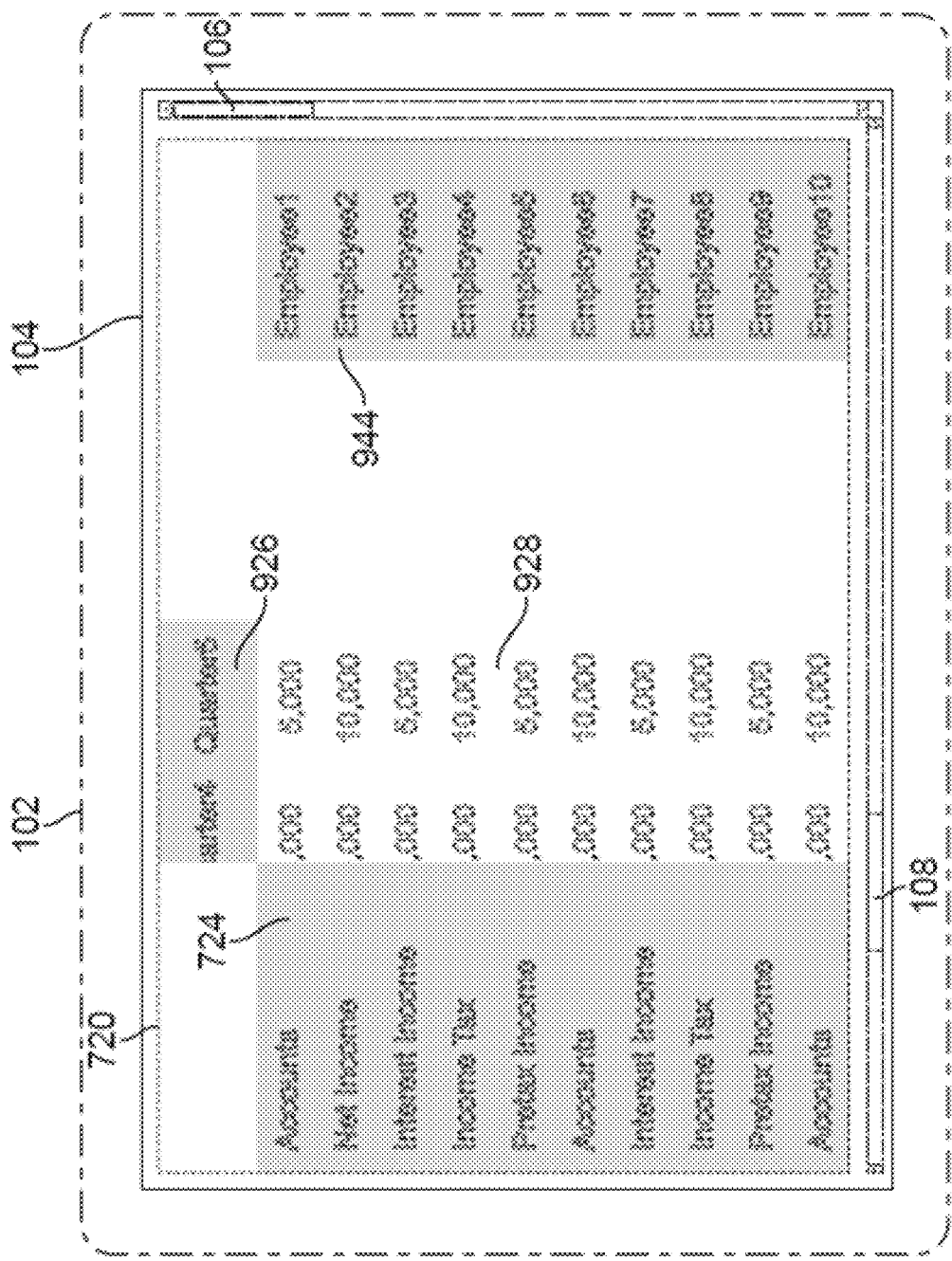
Figure 19:
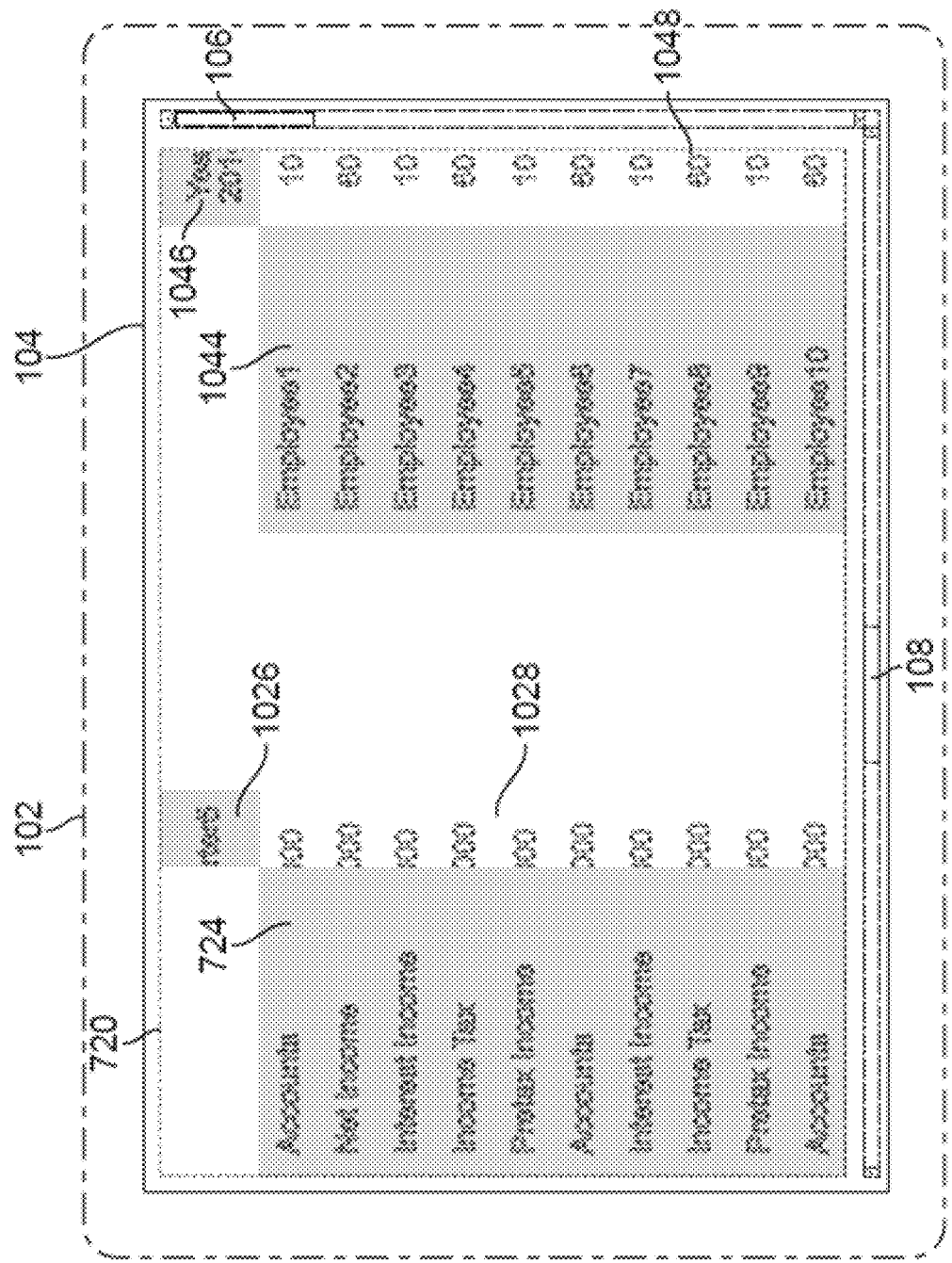
Figure 20:
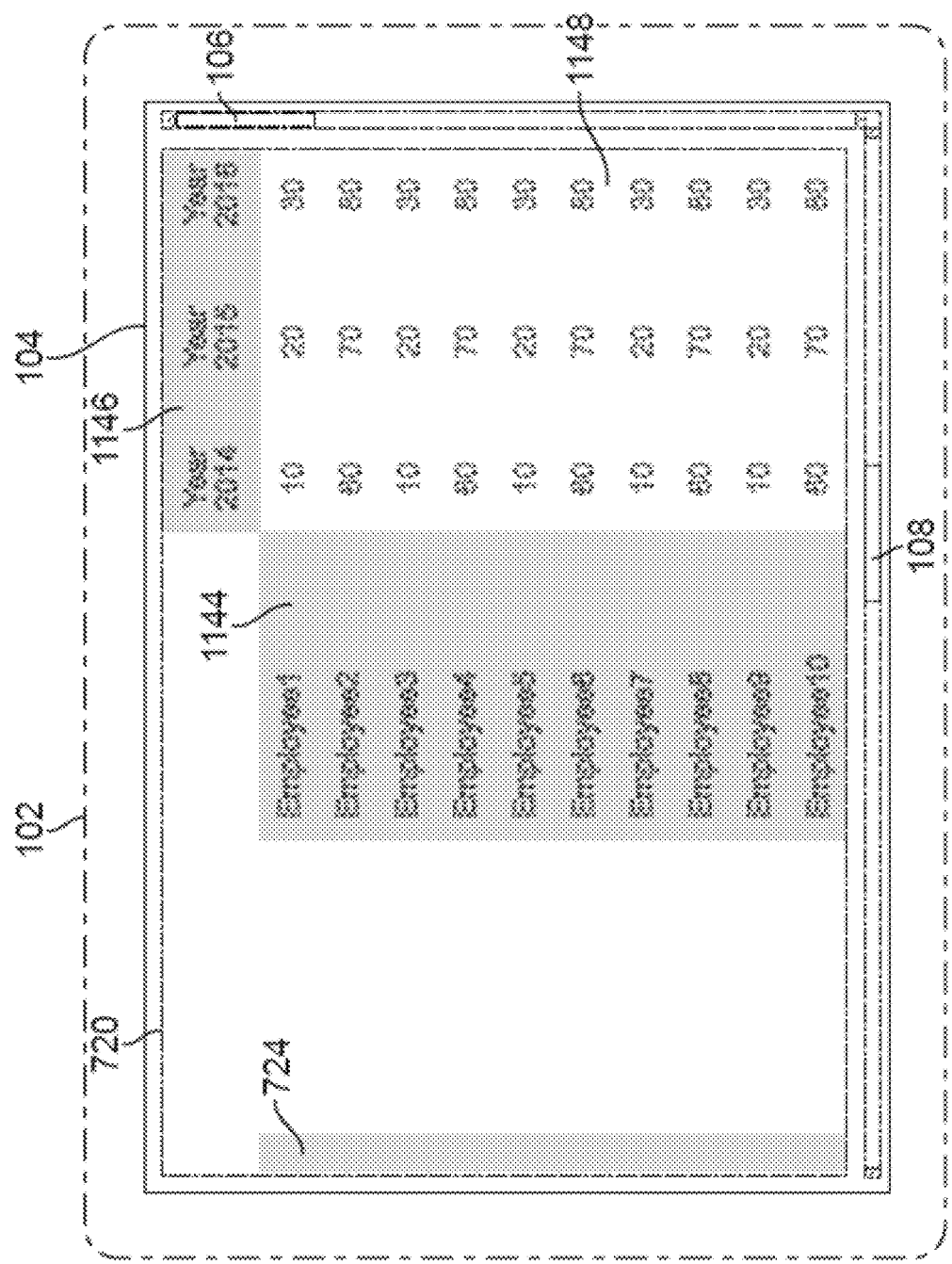
Figure 21:
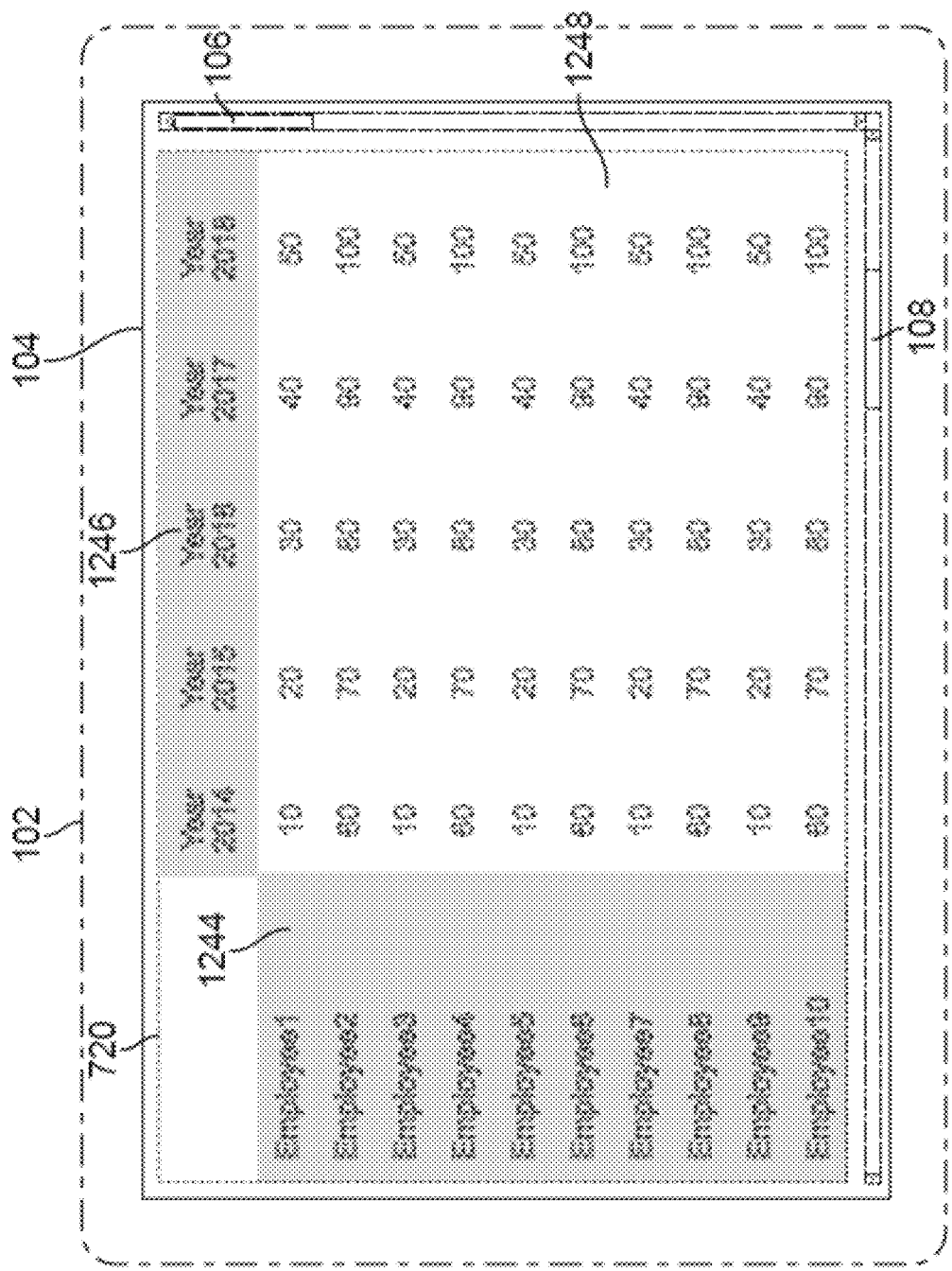

FIGS. 16-19 show that header 726 of FIG. 16 adjusts to 826, 926, and 1026 of FIGS. 17-19, respectively. Headers that adjust to show attributes corresponding to data in a databody are sticky so that the appropriate attribute can be seen in the header with respect to the data for that attribute. In FIGS. 16-20, header 724 remains static since the data in databody 728 corresponding to the attributes in header 724 are visible at all times in the examples shown in FIGS. 16-19. Headers 724 remains visible so long as the databody for the headers is visible. FIGS. 19-21 show that header 1046 of FIG. 19 adjusts to 1146 and 1246 of FIGS. 20-21, respectively, as a user scrolls horizontally with element 108. Header 1044 is shown with respect to databody 1048 shown in FIG. 19. Header 1044 changes to 1144 and 1244 of FIGS. 20-21, respectively, as a user scrolls horizontally with element 108. In the examples of FIGS. 19-21, both headers may change to be sticky with respect to the portions of databody showing data corresponding to attributes in the headers.

IV. Computing Environments for Display Management System

Figure 22:
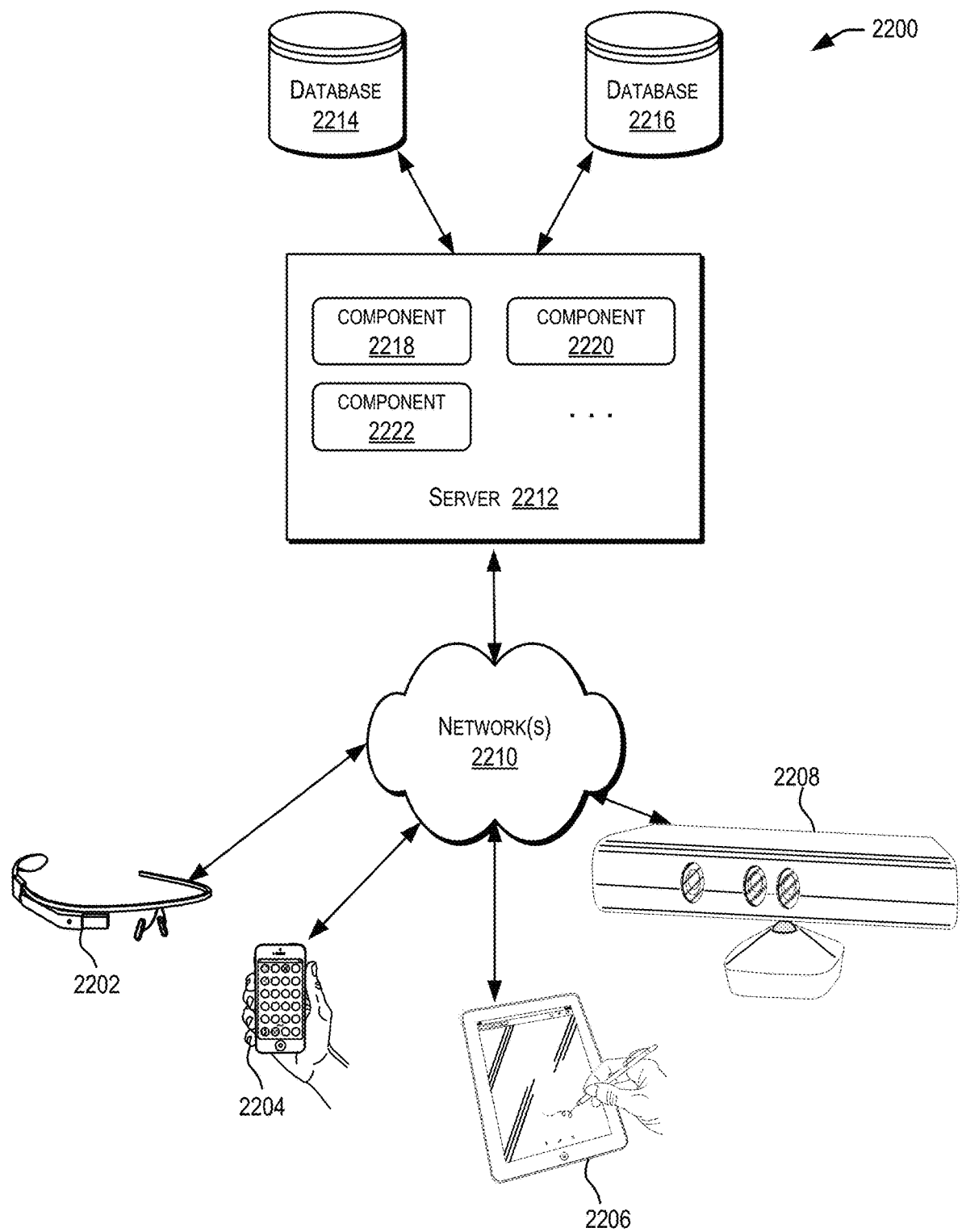
FIG. 22 depicts a simplified diagram of a distributed system for implementing an embodiment.

FIG. 22 depicts a simplified diagram of a distributed system 2200 for implementing an embodiment. In the illustrated embodiment, distributed system 2200 includes one or more client computing devices 2202, 2204, 2206, and 2208, which are configured to execute and operate a client application such as a web browser, proprietary client (e.g., Oracle Forms), or the like over one or more network(s) 2210. Server 2212 may be communicatively coupled with remote client computing devices 2202, 2204, 2206, and 2208 via network 2210.

In various embodiments, server 2212 may be adapted to run one or more services or software applications. In certain embodiments, server 2212 may also provide other services or software applications can include non-virtual and virtual environments. In some embodiments, these services may be offered as web-based or cloud services or under a Software as a Service (SaaS) model to the users of client computing devices 2202, 2204, 2206, and/or 2208. Users operating client computing devices 2202, 2204, 2206, and/or 2208 may in turn utilize one or more client applications to interact with server 2212 to utilize the services provided by these components.

In the configuration depicted in FIG. 22, software components 2218, 2220 and 2222 of system 2200 are shown as being implemented on server 2212. In other embodiments, one or more of the components of system 2200 and/or the services provided by these components may also be implemented by one or more of the client computing devices 2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The embodiment shown in FIG. 22 is thus one example of a distributed system for implementing an embodiment system and is not intended to be limiting.

Client computing devices 2202, 2204, 2206, and/or 2208 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2210.

Although distributed system 2200 in FIG. 22 is shown with four client computing devices, any number of client computing devices may be supported. Other devices, such as devices with sensors, etc., may interact with server 2212.

Network(s) 2210 in distributed system 2200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 2210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2212 can include one or more virtual machines running virtual operating systems, or other computing architectures involving virtualization. One or more flexible pools of logical storage devices can be virtualized to maintain virtual storage devices for the server. Virtual networks can be controlled by server 2212 using software defined networking. In various embodiments, server 2212 may be adapted to run one or more services or software applications described in the foregoing disclosure. For example, server 2212 may correspond to a server for performing processing as described above according to an embodiment of the present disclosure.

Server 2212 may run an operating system including any of those discussed above, as well as any commercially available server operating system. Server 2212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2212 may include one or more applications to analyze and consolidate data feeds and/or event updates received from users of client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2212 may also include one or more applications to display the data feeds and/or real-time events via one or more display devices of client computing devices 2202, 2204, 2206, and 2208.

Distributed system 2200 may also include one or more databases 2214 and 2216. These databases may provide a mechanism for storing information such as user interactions information, usage patterns information, adaptation rules information, and other information used by embodiments of the present disclosure. Databases 2214 and 2216 may reside in a variety of locations. By way of example, one or more of databases 2214 and 2216 may reside on a non-transitory storage medium local to (and/or resident in) server 2212. Alternatively, databases 2214 and 2216 may be remote from server 2212 and in communication with server 2212 via a network-based or dedicated connection. In one set of embodiments, databases 2214 and 2216 may reside in a storage-area network (SAN). Similarly, any necessary files for performing the functions attributed to server 2212 may be stored locally on server 2212 and/or remotely, as appropriate. In one set of embodiments, databases 2214 and 2216 may include relational databases, such as databases provided by Oracle that are adapted to store, update, and retrieve data in response to SQL-formatted commands.

Figure 23:
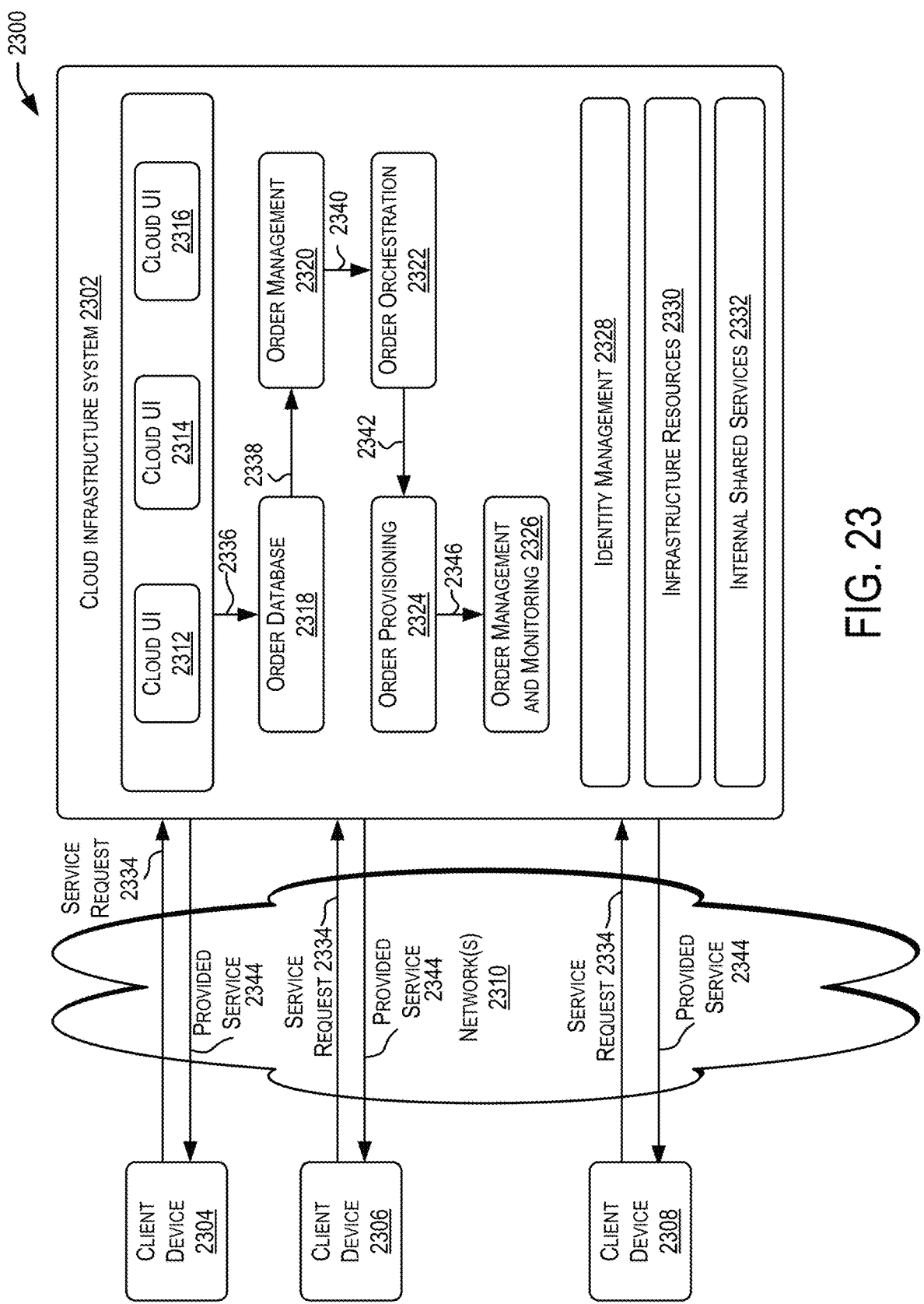
FIG. 23 illustrates a simplified block diagram of one or more components of a system environment in which services may be offered as cloud services, in accordance with an embodiment of the present disclosure.

In some embodiments, a cloud environment may provide one or more services. FIG. 23 is a simplified block diagram of one or more components of a system environment 2300 in which services may be offered as cloud services, in accordance with an embodiment of the present disclosure. In the illustrated embodiment in FIG. 23, system environment 2300 includes one or more client computing devices 2304, 2306, and 2308 that may be used by users to interact with a cloud infrastructure system 2302 that provides cloud services. Cloud infrastructure system 2302 may comprise one or more computers and/or servers that may include those described above for server 2212.

It should be appreciated that cloud infrastructure system 2302 depicted in FIG. 23 may have other components than those depicted. Further, the embodiment shown in FIG. 23 is only one example of a cloud infrastructure system that may incorporate an embodiment of the disclosure. In some other embodiments, cloud infrastructure system 2302 may have more or fewer components than shown in the figure, may combine two or more components, or may have a different configuration or arrangement of components.

Client computing devices 2304, 2306, and 2308 may be devices similar to those described above for client computing devices 2202, 2204, 2206, and 2208. Client computing devices 2304, 2306, and 2308 may be configured to operate a client application such as a web browser, a proprietary client application (e.g., Oracle Forms), or some other application, which may be used by a user of the client computing device to interact with cloud infrastructure system 2302 to use services provided by cloud infrastructure system 2302. Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between client computing devices 2304, 2306, and 2308 and cloud infrastructure system 2302. Each network may be any type of network familiar to those skilled in the art that can support data communications using any of a variety of commercially-available protocols, including those described above for network(s) 2210.

In certain embodiments, services provided by cloud infrastructure system 2302 may include a host of services that are made available to users of the cloud infrastructure system on demand. In addition to services related to managing display of content, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle Corporation) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some embodiments, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some embodiments, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2302 may also include infrastructure resources 2330 for providing the resources used to provide various services to customers of the cloud infrastructure system. In one embodiment, infrastructure resources 2330 may include pre-integrated and optimized combinations of hardware, such as servers, storage, and networking resources to execute the services provided by the PaaS platform and the SaaS platform, and other resources.

In some embodiments, resources in cloud infrastructure system 2302 may be shared by multiple users and dynamically re-allocated per demand. Additionally, resources may be allocated to users in different time zones. For example, cloud infrastructure system 2302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2332 may be provided that are shared by different components or modules of cloud infrastructure system 2302 to enable provision of services by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2302, and the like.

In one embodiment, as depicted in FIG. 23, cloud management functionality may be provided by one or more modules, such as an order management module 2320, an order orchestration module 2322, an order provisioning module 2324, an order management and monitoring module 2326, and an identity management module 2328. These modules may include or be provided using one or more computers and/or servers, which may be general purpose computers, specialized server computers, server farms, server clusters, or any other appropriate arrangement and/or combination.

In an exemplary operation, at step 2334, a customer using a client device, such as client computing devices 2304, 2306 or 2308, may interact with cloud infrastructure system 2302 by requesting one or more services provided by cloud infrastructure system 2302 and placing an order for a subscription for one or more services offered by cloud infrastructure system 2302. In certain embodiments, the customer may access a cloud User Interface (UI) such as cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 that the customer intends to subscribe to.

At step 2336, the order information received from the customer may be stored in an order database 2318. If this is a new order, a new record may be created for the order. In one embodiment, order database 2318 can be one of several databases operated by cloud infrastructure system 2318 and operated in conjunction with other system elements.

At step 2338, the order information may be forwarded to an order management module 2320 that may be configured to perform billing and accounting functions related to the order, such as verifying the order, and upon verification, booking the order.

At step 2340, information regarding the order may be communicated to an order orchestration module 2322 that is configured to orchestrate the provisioning of services and resources for the order placed by the customer. In some instances, order orchestration module 2322 may use the services of order provisioning module 2324 for the provisioning. In certain embodiments, order orchestration module 2322 enables the management of business processes associated with each order and applies business logic to determine whether an order should proceed to provisioning.

As shown in the embodiment depicted in FIG. 23, at step 2342, upon receiving an order for a new subscription, order orchestration module 2322 sends a request to order provisioning module 2324 to allocate resources and configure resources needed to fulfill the subscription order. Order provisioning module 2324 enables the allocation of resources for the services ordered by the customer. Order provisioning module 2324 provides a level of abstraction between the cloud services provided by cloud infrastructure system 2300 and the physical implementation layer that is used to provision the resources for providing the requested services. This enables order orchestration module 2322 to be isolated from implementation details, such as whether or not services and resources are actually provisioned on the fly or pre-provisioned and only allocated/assigned upon request.

At step 2344, once the services and resources are provisioned, a notification may be sent to the subscribing customers indicating that the requested service is now ready for use. In some instance, information (e.g. a link) may be sent to the customer that enables the customer to start using the requested services.

At step 2346, a customer's subscription order may be managed and tracked by an order management and monitoring module 2326. In some instances, order management and monitoring module 2326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2300 may include an identity management module 2328 that is configured to provide identity services, such as access management and authorization services in cloud infrastructure system 2300. In some embodiments, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.). Identity management module 2328 may also include the management of descriptive information about each customer and about how and by whom that descriptive information can be accessed and modified.

Figure 24:
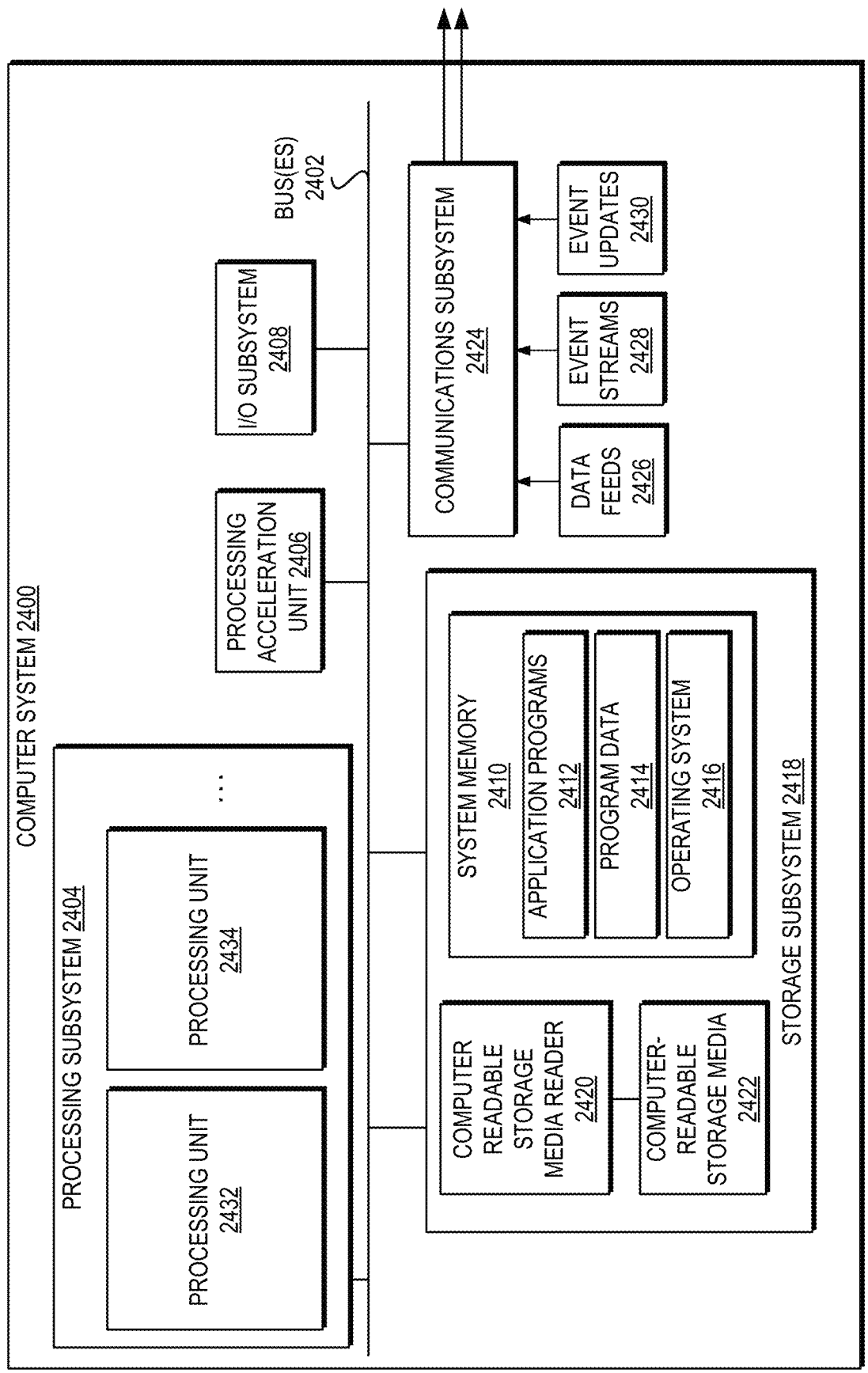
FIG. 24 illustrates an exemplary computer system that may be used to implement an embodiment of the present disclosure.

FIG. 24 illustrates an exemplary computer system 2400 that may be used to implement an embodiment of the present disclosure. In some embodiments, computer system 2400 may be used to implement any of the various servers and computer systems described above. As shown in FIG. 24, computer system 2400 includes various subsystems including a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 may include tangible computer-readable storage media 2422 and a system memory 2410.

Bus subsystem 2402 provides a mechanism for letting the various components and subsystems of computer system 2400 communicate with each other as intended. Although bus subsystem 2402 is shown schematically as a single bus, alternative embodiments of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2404 controls the operation of computer system 2400 and may comprise one or more processing units 2432, 2434, etc. A processing unit may include be one or more processors, including single core or multicore processors, one or more cores of processors, or combinations thereof. In some embodiments, processing subsystem 2404 can include one or more special purpose co-processors such as graphics processors, digital signal processors (DSPs), or the like. In some embodiments, some or all of the processing units of processing subsystem 2404 can be implemented using customized circuits, such as application specific integrated circuits (ASICs), or field programmable gate arrays (FPGAs).

In some embodiments, the processing units in processing subsystem 2404 can execute instructions stored in system memory 2410 or on computer readable storage media 2422. In various embodiments, the processing units can execute a variety of programs or code instructions and can maintain multiple concurrently executing programs or processes. At any given time, some or all of the program code to be executed can be resident in system memory 2410 and/or on computer-readable storage media 2422 including potentially on one or more storage devices. Through suitable programming, processing subsystem 2404 can provide various functionalities described above for managing display of content.

In certain embodiments, a processing acceleration unit 2406 may be provided for performing customized processing or for off-loading some of the processing performed by processing subsystem 2404 so as to accelerate the overall processing performed by computer system 2400.

I/O subsystem 2408 may include devices and mechanisms for inputting information to computer system 2400 and/or for outputting information from or via computer system 2400. In general, use of the term "input device" is intended to include all possible types of devices and mechanisms for inputting information to computer system 2400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2418 provides a repository or data store for storing information that is used by computer system 2400. Storage subsystem 2418 provides a tangible non-transitory computer-readable storage medium for storing the basic programming and data constructs that provide the functionality of some embodiments. Software (programs, code modules, instructions) that when executed by processing subsystem 2404 provide the functionality described above may be stored in storage subsystem 2418. The software may be executed by one or more processing units of processing subsystem 2404. Storage subsystem 2418 may also provide a repository for storing data used in accordance with the present disclosure.

Storage subsystem 2418 may include one or more non-transitory memory devices, including volatile and non-volatile memory devices. As shown in FIG. 24, storage subsystem 2418 includes a system memory 2410 and a computer-readable storage media 2422. System memory 2410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2400, such as during start-up, may typically be stored in the ROM. The RAM typically contains data and/or program modules that are presently being operated and executed by processing subsystem 2404. In some implementations, system memory 2410 may include multiple different types of memory, such as static random access memory (SRAM) or dynamic random access memory (DRAM).

By way of example, and not limitation, as depicted in FIG. 24, system memory 2410 may store application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2422 may store programming and data constructs that provide the functionality of some embodiments. Software (programs, code modules, instructions) that when executed by processing subsystem 2404 a processor provide the functionality described above may be stored in storage subsystem 2418. By way of example, computer-readable storage media 2422 may include non-volatile memory such as a hard disk drive, a magnetic disk drive, an optical disk drive such as a CD ROM, DVD, a Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2422 may provide storage of computer-readable instructions, data structures, program modules, and other data for computer system 2400.

In certain embodiments, storage subsystem 2400 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for storing computer-readable information.

In certain embodiments, computer system 2400 may provide support for executing one or more virtual machines. Computer system 2400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2400. Accordingly, multiple operating systems may potentially be run concurrently by computer system 2400. Each virtual machine generally runs independently of the other virtual machines.

Communications subsystem 2424 provides an interface to other computer systems and networks. Communications subsystem 2424 serves as an interface for receiving data from and transmitting data to other systems from computer system 2400. For example, communications subsystem 2424 may enable computer system 2400 to establish a communication channel to one or more client computing devices via the Internet for receiving and sending information from and to the client computing devices.

Communication subsystem 2424 may support both wired and/or wireless communication protocols. For example, in certain embodiments, communications subsystem 2424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2424 can provide wired network connectivity (e.g., Ethernet) in addition to or instead of a wireless interface.

Communication subsystem 2424 can receive and transmit data in various forms. For example, in some embodiments, communications subsystem 2424 may receive input communication in the form of structured and/or unstructured data feeds 2426, event streams 2428, event updates 2430, and the like. For example, communications subsystem 2424 may be configured to receive (or send) data feeds 2426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2424 may be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computer system 2400.

Computer system 2400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2400 depicted in FIG. 24 is intended only as a specific example. Many other configurations having more or fewer components than the system depicted in FIG. 24 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method executed by a processor, the method comprising:
   determining a layout to display data corresponding to content in an electronic document at a device, wherein the electronic document includes a first table, and wherein the layout includes a first header, a second header, a corner corresponding to an area where the first header intersects the second header, and a first data section configured to display data from the first table;
   identifying a plurality of attributes for presenting a first view of the electronic document at the device, the plurality of attributes including a first set of one or more attributes and a second set of one or more attributes;
   displaying on the device a graphical interface, wherein the graphical interface presents the first view, and wherein in the first view:
      the first header displays each attribute in the first set of one or more attributes,
      the second header displays each attribute in the second set of one or more attributes, and
      the first data section displays a portion of the data from the first table, the portion of the data corresponding to the attributes displayed in the first header and the second header;
   monitoring input corresponding to user interaction with the graphical interface;
   determining, based on the monitoring, an adjustment to the data displayed in the first data section in the first view, the adjustment caused by user scrolling along a first direction, wherein the adjustment causes some of the data displayed in the first data section in the first view to no longer be visible;

responsive to determining that the adjustment will cause some of the data displayed in the first data section in the first view to no longer be visible, updating the graphical interface to present a second view of the electronic document at the device, wherein in the second view:
- the displayed first header is modified to scroll under the corner and according to the user scrolling along the first direction such that an attribute displayed in the first header in the first view is not displayed in the second view,
- the displayed second header is kept the same as in the first view based on the user scrolling not being along a second direction perpendicular to the first direction, and
- the displayed first data section is modified to scroll under the second header based on the adjustment;

detecting further user scrolling along the first direction after the second view is presented, the further user scrolling going beyond the first data section such that the first data section is no longer visible; and based on the detecting of the further user scrolling, moving the second header out of view.

2. The method of claim 1, wherein the user interaction includes a movement of an element in the graphical interface, the movement corresponding to user scrolling in a vertical direction, and wherein the first header is a row header.

3. The method of claim 1, wherein the user interaction includes a movement of an element in the graphical interface, the movement corresponding to user scrolling in a horizontal direction, and wherein the first header is a column header.

4. The method of claim 1, wherein in the second view, the first data section displays at least some of the data displayed in the first data section during the first view.

5. The method of claim 1, wherein the layout is a grid comprising a first section corresponding to the first header, a second section corresponding to the second header, and the first data section.

6. The method of claim 1, wherein the first header is a row header, and wherein the second header is a column header.

7. The method of claim 1, wherein the first header is a column header, and wherein the second header is a row header.

8. The method of claim 1, wherein each attribute of the plurality of attributes corresponds to a different dimension of the data from the first table.

9. A system comprising:
one or more processors; and
a memory accessible to the one or more processors, the memory comprising instructions that, when executed by the one or more processors, cause the one or more processors to:
- determine a layout to display data corresponding to content in an electronic document at a device, wherein the electronic document includes a first table, and wherein the layout includes a first header, a second header, a corner corresponding to an area where the first header intersects the second header, and a first data section configured to display data from the first table;
- identify a plurality of attributes for presenting a first view of the electronic document at the device, the plurality of attributes including a first set of one or more attributes and a second set of one or more attributes;
- display on the device a graphical interface, wherein the graphical interface presents the first view, and wherein in the first view:
  - the first header displays each attribute in the first set of one or more attributes,
  - the second header displays each attribute in the second set of one or more attributes, and
  - the first data section displays a portion of the data from the first table, the portion of the data corresponding to the attributes displayed in the first header and the second header;
- monitor input corresponding to user interaction with the graphical interface;
- determine, based on the monitoring, an adjustment to the data displayed in the first data section in the first view, the adjustment caused by user scrolling along a first direction, wherein the adjustment causes some of the data displayed in the first data section in the first view to no longer be visible;
- responsive to determining that the adjustment will cause some of the data displayed in the first data section in the first view to no longer be visible, update the graphical interface to present a second view of the electronic document at the device, wherein in the second view:
  - the displayed first header is modified to scroll under the corner and according to the user scrolling along the first direction such that an attribute displayed in the first header in the first view is not displayed in the second view,
  - the displayed second header is kept the same as in the first view based on the user scrolling not being along a second direction perpendicular to the first direction, and
  - the displayed first data section is modified to scroll under the second header based on the adjustment;
- detect further user scrolling along the first direction after the second view is presented, the further user scrolling going beyond the first data section such that the first data section is no longer visible; and
- based on the detecting of the further user scrolling, move the second header out of view.

10. The system of claim 9, wherein the user interaction includes a movement of an element in the graphical interface, the movement corresponding to user scrolling in a vertical direction, and wherein the first header is a row header.

11. The system of claim 9, wherein the user interaction includes a movement of an element in the graphical interface, the movement corresponding to user scrolling in a horizontal direction, and wherein the first header is a column header.

12. The system of claim 9, wherein in the second view, the first data section displays at least some of the data displayed in the first data section during the first view.

13. The system of claim 9, wherein the first header is a row header, and wherein the second header is a column header.

14. The system of claim 9, wherein the first header is a column header, and wherein the second header is a row header.

15. A method for managing display of headers, the method comprising performing the following by a processor of a computer:
generating a graphical interface on a display device according to a layout, the layout comprising a first row header, a first column header, and a first data section, wherein the first row header is a row header of a first table, the first column header is a column header of the first table, and the first data section is configured to display data from the first table, the data displayed in the first data section corresponding to displayed content of the first row header and displayed content of the first column header;

after generating the graphical interface on the display device, detecting user scrolling in a vertical or horizontal direction;

determining, based on the user scrolling, an adjustment to the data displayed in the first data section and that the adjustment will cause some of the data displayed in the first data section to no longer be visible;

updating the graphical interface to reflect the adjustment, the updating comprising:

modifying, based on the user scrolling, the displayed content of the first row header or the displayed content of the first column header, wherein the first row header is kept unchanged when the user scrolling is not vertical, and wherein the first column header is kept unchanged when the user scrolling is not horizontal; and modifying the displayed first data section to display, according to the adjustment, different data from the first table, wherein the modifying of the first data section includes scrolling the first data section under the first row header when the user scrolling is horizontal, and scrolling the first data section under the first column header when the user scrolling is vertical; and based on detecting further user scrolling in the same vertical or horizontal direction after the first data section has been modified to display different data from the first table, the further user scrolling going beyond the first data section such that the first data section is no longer visible, moving the first row header or the first column header out of view.

16. The method of claim 15, wherein the graphical interface is updated by generating a view based on an order defined for the layout, the order specifying that the data displayed in the first data section is to be determined before determining the displayed contents of the first row header and the first column header.

17. The method of claim 1, wherein the electronic document includes a second table, wherein the layout includes a third header and a second data section, wherein the third header is a header of the second table, wherein the second data section is configured to display data from the second table, and wherein the method further comprises:

detecting continued user scrolling along the first direction beyond the first data section and to the second data section such that the second data section is visible; and based on the detecting of the continued user scrolling, updating the graphical interface to present a third view in which the second header is excluded from display and the third header is visible.

18. The system of claim 9, wherein the electronic document includes a second table, wherein the layout includes a third header and a second data section, wherein the third header is a header of the second table, wherein the second data section is configured to display data from the second table, and wherein the instructions, when executed by the one or more processors, further cause the one or more processors to:

detect continued user scrolling along the first direction beyond the first data section and to the second data section such that the second data section is visible; and based on the detecting of the continued user scrolling, update the graphical interface to present a third view in which the second header is excluded from display and the third header is visible.

19. The method of claim 15, wherein the layout further comprises a second row header, a second column header, and a second data section, wherein the second row header is a row header of a second table, wherein the second column header is a column header of the second table, wherein the second data section is configured to display data from the second table, and wherein the method further comprises:

based on detecting user scrolling beyond the first data section and to the second data section such that the second data section is visible, updating the graphical interface such that the first row header or the first column header is excluded from display, and such that the second row header and the second column header are visible.

20. The method of claim 1, wherein the corner is kept the same in the second view as in the first view and is moved out of view together with the second header.

21. The method of claim 1, further comprising:

performing, by a display management system and as part of providing a cloud service under a Software as a Service (SaaS) model, the steps of determining the layout, identifying the plurality of attributes for presenting the first view, displaying the graphical interface at the device, detecting the adjustment to the data displayed in the first data section in the first view, and updating the graphical interface to present the second view.

\* \* \* \* \*